(12) United States Patent
Hayakawa

(10) Patent No.: US 12,459,693 B2
(45) Date of Patent: Nov. 4, 2025

(54) STERILIZATION METHOD

(71) Applicant: Dai Nippon Printing Co., Ltd., Tokyo (JP)

(72) Inventor: Atsushi Hayakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 88 days.

(21) Appl. No.: 17/996,445

(22) PCT Filed: Mar. 30, 2021

(86) PCT No.: PCT/JP2021/013733
§ 371 (c)(1),
(2) Date: Oct. 18, 2022

(87) PCT Pub. No.: WO2021/229946
PCT Pub. Date: Nov. 18, 2021

(65) Prior Publication Data
US 2023/0202696 A1 Jun. 29, 2023

(30) Foreign Application Priority Data
May 14, 2020 (JP) .................................. 2020-085425

(51) Int. Cl.
*A61L 2/18* (2006.01)
*B65B 55/02* (2006.01)
*B65B 55/10* (2006.01)

(52) U.S. Cl.
CPC ................ *B65B 55/10* (2013.01); *A61L 2/18* (2013.01); *B65B 55/02* (2013.01)

(58) Field of Classification Search
CPC ......... B65B 55/10; B65B 55/18; B65B 55/14; B65B 2210/06; B65B 2210/08;
(Continued)

(56) References Cited

U.S. PATENT DOCUMENTS 3,945,411 A * 3/1976 Skoli ..................... B67C 3/001
134/169 C
7,571,621 B2 * 8/2009 Dietschi ................ F25D 31/003
62/434
(Continued)

FOREIGN PATENT DOCUMENTS

CN 207639408 U 7/2018
EP 1 133 320 B1 12/2003
(Continued)

OTHER PUBLICATIONS

International Search Report and Written Opinion (Application No. PCT/JP2021/013733) dated Jun. 22, 2021 (with English translation).
(Continued)

*Primary Examiner* — Thanh K Truong
*Assistant Examiner* — Linda J. Hodge
(74) *Attorney, Agent, or Firm* — BURR PATENT LAW, PLLC

(57) ABSTRACT

A sterilization method includes a circulation step of circulating a sterilizer through a circulation line (53) while the sterilizer is being heated by a heater (H), and a sterilization step of sterilizing a filling chamber (42) by supplying, to the filling chamber (42), the sterilizer heated by the heater (H).

15 Claims, 10 Drawing Sheets

(58) Field of Classification Search
CPC . B67C 3/001; B67C 3/005; A61L 2/18; A61L 2/186
USPC .................................................. 53/426, 425
See application file for complete search history.

(56) References Cited

U.S. PATENT DOCUMENTS

| | | | | |
|---|---|---|---|---|
| 2003/0146108 | A1* | 8/2003 | Nakamura | A61L 2/18 205/705 |
| 2004/0245116 | A1* | 12/2004 | Ohsaka | C25B 1/28 422/31 |
| 2014/0286822 | A1* | 9/2014 | Hayakawa | A23L 2/46 422/1 |
| 2015/0298178 | A1* | 10/2015 | Hayakawa | B08B 9/027 134/22.1 |
| 2016/0046475 | A1* | 2/2016 | Hayakawa | B67C 3/005 134/22.18 |
| 2016/0121376 | A1* | 5/2016 | Hayakawa | B08B 9/0325 422/3 |
| 2016/0185584 | A1* | 6/2016 | Hayakawa | B67C 7/0073 53/426 |
| 2017/0290938 | A1* | 10/2017 | Hayakawa | A61L 2/04 |
| 2018/0178258 | A1* | 6/2018 | Soellner | B08B 3/14 |
| 2020/0277178 | A1* | 9/2020 | Hayakawa | B08B 9/0321 |
| 2021/0009396 | A1* | 1/2021 | Hayakawa | A61L 2/18 |
| 2021/0269298 | A1* | 9/2021 | Hayakawa | A61L 2/22 |
| 2023/0043811 | A1* | 2/2023 | Hayakawa | B65B 55/025 |
| 2023/0202696 | A1* | 6/2023 | Hayakawa | B65B 55/06 53/426 |
| 2024/0010520 | A1* | 1/2024 | Hayakawa | A23L 2/50 |
| 2024/0059541 | A1* | 2/2024 | Hayakawa | C02F 1/001 |

FOREIGN PATENT DOCUMENTS

| | | | | |
|---|---|---|---|---|
| JP | H06-021544 | Y2 | 6/1994 | |
| JP | 2000-153245 | A | 6/2000 | |
| JP | 3315918 | B2 | 8/2002 | |
| JP | 2004-299723 | A | 10/2004 | |
| JP | 2007-022600 | A | 2/2007 | |
| JP | 2007-331801 | A | 12/2007 | |
| JP | 2010-189034 | A | 9/2010 | |
| JP | 2012-200456 | A | 10/2012 | |
| JP | 2014-055026 | A | 3/2014 | |
| JP | 2015-002855 | A | 1/2015 | |
| JP | 2018-135113 | A | 8/2018 | |
| JP | 2018-135134 | A | 8/2018 | |
| JP | 2020-020778 | A | 2/2020 | |
| WO | 2007/148442 | A1 | 12/2007 | |
| WO | WO-2018199230 | A1 * | 11/2018 | ............. A61L 2/186 |
| WO | WO-2019069967 | A1 * | 4/2019 | ............... A61L 2/04 |
| WO | 2021/229946 | A1 | 11/2021 | |

OTHER PUBLICATIONS

English translation of International Preliminary Report on Patentability (Chapter I) (Application No. PCT/JP2021/013733) dated Nov. 24, 2022.
Chinese Office Action (with English translation) dated Apr. 25, 2024 (Application No. 202180035327.0).
Extended European Search Report dated May 15, 2024 (Application No. 21804402.2).
Japanese Office Action (with English translation) dated Sep. 13, 2024 (Application No. 2022-129411).
Chinese Office Action (with English translation) dated Mar. 12, 2025 (Application No. 202180035327.0).

* cited by examiner

STERILIZATION METHOD

TECHNICAL FIELD

The present disclosure relates to a sterilization method.

BACKGROUND ART

As a known example of a system for filling beverages into containers such as bottles, there has been a content filling system that sterilizes not only the beverage itself, but also a surge tank, pipes, a filling nozzle, and so on into a sterile state. In that type of content filling system, the so-called CIP (Cleaning in Place) and SIP (Sterilization in Place) are performed, for example, when the type of beverage is changed (e.g., Patent Documents 1 to 3).

The CIP is to remove beverage residuals and so on having adhered to a beverage flow path and tank in the preceding cycle and is performed, for example, by pouring a cleaning liquid, prepared by adding an alkaline agent such as caustic soda to water, through the beverage flow path, and then further pouring a cleaning liquid, prepared by adding an acidic agent to water, through the beverage flow path.

The SIP is to sterilize the beverage flow path and tank into a sterile state and is performed, for example, by pouring heated steam or hot water through the flow path after the cleaning by the CIP.

Moreover, for the inside of a filling chamber in which a filling device for filling contents is disposed, the so-called COP (Cleaning out of Place) and SOP (Sterilizing out of Place) are performed to clean the inside of the filling chamber (e.g., Patent Documents 4 to 7).

Various injection nozzles are disposed inside the filling chamber. When the COP and the SOP are performed, a sterilizer, such as an alkaline detergent, a peracetic detergent, or aqueous hydrogen peroxide, and sterile water, for example, are successively injected from those nozzles in the form of a mist or a shower inside the filling chamber. Inner wall surfaces of the filling chamber and surfaces of equipment such as a filling device (filler) are cleaned and sterilized with, for example, the mist or the shower of the sterilizer and the sterile water.

The sterilizer injected into the filling chamber is prepared by adding water to a sterilizer concentrate in some cases. However, there is a possibility that microorganism survive in the water added to the sterilizer concentrate from the stage before being added. In such a case, the microorganism may survive in the sterilizer. When the microorganism survive in the sterilizer from the beginning like the above case, there is a possibility that, even when the sterilizer is injected into the filling chamber, the microorganism surviving in the sterilizer further survive inside the filling chamber. This may cause reduction in sterilization effect of the sterilizer and may result in insufficient sterilization of the filling chamber.

CITATION LIST

Patent Literature

PATENT DOCUMENT 1: Japanese Unexamined Patent Application Publication No. 2007-331801
PATENT DOCUMENT 2: Japanese Unexamined Patent Application Publication No. 2000-153245
PATENT DOCUMENT 3: Japanese Unexamined Patent Application Publication No. 2007-22600
PATENT DOCUMENT 4: Japanese Patent No. 3315918
PATENT DOCUMENT 5: Japanese Unexamined Patent Application Publication No. 2004-299723
PATENT DOCUMENT 6: Japanese Unexamined Patent Application Publication No. 2010-189034
PATENT DOCUMENT 7: Japanese Unexamined Patent Application Publication No. 2018-135134

The present disclosure has been made in consideration of the above-described point, and an object of the present disclosure is to provide a sterilization method capable of suppressing the reduction in sterilization effect of the sterilizer.

SUMMARY OF INVENTION

In an embodiment, the present disclosure provides a sterilization method for use in a sterilization system including a circulation line in which a heater to heat a sterilizer is disposed, and a main chamber coupled to the circulation line, the sterilization method including a circulation step of circulating the sterilizer through the circulation line while the sterilizer is being heated by the heater, and a sterilization step of sterilizing the main chamber by supplying, to the main chamber, the sterilizer heated by the heater.

In the sterilization method according to the embodiment, the sterilization system may further include a tank coupled to the circulation line and storing the sterilizer that is prepared from water and a sterilizer concentrate, a water supply unit that supplies the water to the tank, a sterilizer concentrate supply unit that supplies the sterilizer concentrate to the tank, and a supply line disposed between the circulation line and the tank, wherein the main chamber may be disposed in the supply line, a filling device to fill contents into bottles may be arranged in the main chamber, the sterilizer in the tank may be circulated through the circulation line in the circulation step while the sterilizer is being heated by the heater, and the sterilizer heated by the heater may be supplied to the main chamber through the supply line in the sterilization step.

The sterilization method according to the embodiment may further include a recovery step of returning, to the tank, the sterilizer supplied to the main chamber.

In the sterilization method according to the embodiment, the sterilization system may further include a tank coupled to the circulation line and storing the sterilizer that is prepared from water and a sterilizer concentrate, a water supply unit that supplies the water to the tank, and a sterilizer concentrate supply unit that supplies the sterilizer concentrate to the tank, wherein the heater and a sterile chamber may be successively disposed in the circulation line, the sterile chamber may include the main chamber and a sub-chamber disposed on at least one of an inlet side and an outlet side of the main chamber, a filling device to fill contents into bottles may be arranged in the main chamber, the sterilizer in the tank may be circulated through the circulation line via the sub-chamber in the circulation step while the sterilizer is being heated by the heater, and the sterilizer heated by the heater may be supplied to the main chamber through the circulation line in the sterilization step.

The sterilization method according to the embodiment may further include a recovery step of returning, to the tank, the sterilizer supplied to the main chamber.

In the sterilization method according to the embodiment, the sterilization system may further include a water supply unit that supplies water to the circulation line, and a sterilizer concentrate supply unit that supplies a sterilizer concentrate to the circulation line, wherein the heater and a sterile chamber may be successively disposed in the circulation line, the sterilizer may be prepared from the water and the sterilizer concentrate, the sterile chamber may include the main chamber and a sub-chamber disposed on at least one of an inlet side and an outlet side of the main chamber, a filling device to fill contents into bottles may be arranged in the main chamber, the sterilizer may be circulated through the circulation line via the sub-chamber in the sterilization step while the sterilizer is being heated by the heater, and the sterilizer heated by the heater may be supplied to the main chamber through the circulation line in the circulation step.

In the sterilization method according to the embodiment, a relationship of;

$$2\times(x1+x2) \leq y \leq 100\times(x1+x2)$$

may be satisfied on an assumption that a volume of the main chamber is denoted by x1, a volume of a flow path for the sterilizer in the circulation line is denoted by x2, and an amount of the sterilizer circulated through the circulation line in the circulation step is denoted by y.

In the sterilization method according to the embodiment, in the sterilization step, a temperature of the sterilizer may be 40° C. or higher and 90° C. or lower.

In the sterilization method according to the embodiment, in the circulation step, a circulation time for the sterilizer to circulate through the circulation line may be 5 min or longer and 60 min or shorter.

In the sterilization method according to the embodiment, the sterilizer may contain peracetic acid or hydrogen peroxide.

In the sterilization method according to the embodiment, in the sterilization step, the sterilizer may be further heated by the heater.

The sterilization method according to the embodiment may further include, prior to the sterilization step, a cleaning step of cleaning the main chamber by supplying an alkaline detergent to the main chamber.

In an embodiment, the present disclosure provides a sterilization system including a circulation line in which a heater to heat a sterilizer is disposed, a main chamber coupled to the circulation line, and a controller connected to the circulation line, wherein the controller causes the sterilizer to be circulated through the circulation line while the sterilizer is being heated by the heater, and causes the sterilizer heated by the heater to be supplied to the main chamber.

According to the present disclosure, the reduction in sterilization effect of the sterilizer can be suppressed.

DESCRIPTION OF EMBODIMENTS

First Embodiment

A first embodiment will be described below with reference to the drawings. FIGS. 1A to 5 illustrate the first embodiment. The drawings described below are drawn in a schematic fashion. Thus, sizes and shapes of individual components are exaggerated as appropriate for easier understanding. The present disclosure can be implemented in forms modified as appropriate insofar as not departing from the technical concept of the present disclosure. In the following drawings, the same components are denoted by the same reference signs, and detailed description of those components is partly omitted in some cases. Numerical values indicating, for example, sizes of individual members explained in this Description and material names for the individual members are merely examples used in the embodiment. The present disclosure is not limited to those examples, and the individual members can be appropriately selected in practical use. It is to be noted that, in this Description, terms specifying shapes and geometrical conditions, for example, terms such as "parallel", "orthogonal", and "vertical", represent not only states exactly meant by the terms, but also substantially the same states.

(Content Filling System)

First, a content filling system (sterile filling system or aseptic filling system) including a filling chamber (main chamber) to be sterilized by a sterilization method according to this embodiment is described with reference to FIG. 1A.

Figure 1A:
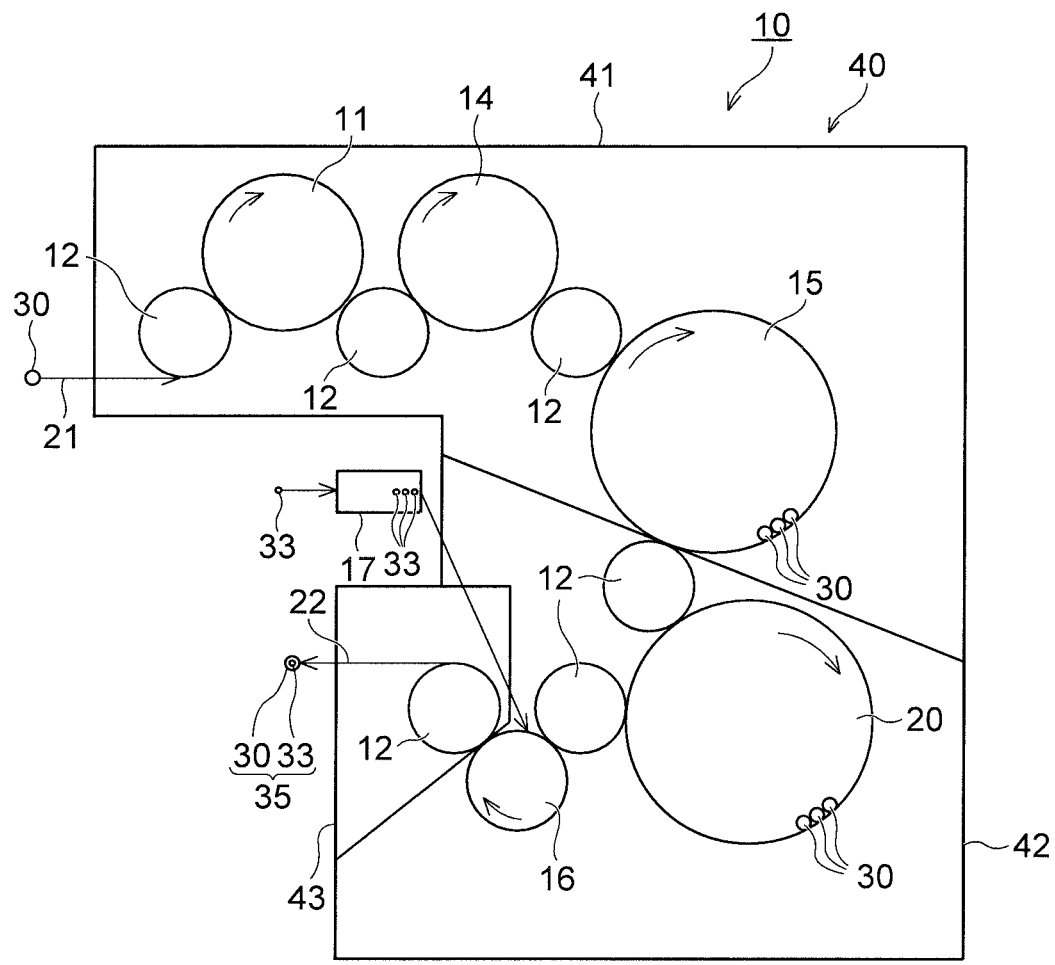
FIG. 1A is a schematic plan view of a content filling system that is sterilized by a sterilization method according to a first embodiment of the present disclosure.

The content filling system 10 illustrated in FIG. 1A is a system for filling contents, such as beverages, into bottles 30. The bottles 30 can be each fabricated by biaxial stretching blow molding of a preform that is manufactured by injection molding of a synthetic resin material. Thermoplastic resin, particularly, PE (polyethylene), PP (polypropylene), PET (polyethylene terephthalate), or PEN (polyethylene naphthalate), is preferably used as a material of the bottles 30. Other containers, such as glass bottles, cans, paper containers, pouches, or composite containers made of some of those different materials may also be used. This embodiment is described in connection with an example in which the bottle made of the synthetic resin is used as the container.

As illustrated in FIG. 1A, the content filling system 10 includes a bottle supply section 21, a bottle sterilization device 11, an air rinsing device 14, a sterile water rinsing device 15, a filling device (filler) 20, a cap fitting device (capper or tightening and plugging machine) 16, and a product bottle carrying-out unit 22. The bottle supply section 21, the bottle sterilization device 11, the air rinsing device 14, the sterile water rinsing device 15, the filling device 20, the cap fitting device 16, and the product bottle carrying-out unit 22 are successively disposed in mentioned order along a conveying direction of the bottles 30 from an upstream side toward a downstream side. Between adjacent twos of the bottle sterilization device 11, the air rinsing device 14, the sterile water rinsing device 15, the filling device 20, and the cap fitting device 16, conveying wheels 12 are disposed to convey the bottles 30 between the devices.

The bottle supply section 21 successively receives the bottles 30 being empty into the content filling system 10 from the outside and conveys the received bottles 30 toward the bottle sterilization device 11.

The bottle sterilization device 11 sterilizes the bottles 30 before filling of the contents by injecting a sterilizer into the bottles 30 and sterilizing the inside of each bottle 30. For example, an aqueous solution of hydrogen peroxide is used as the sterilizer. In the bottle sterilization device 11, the aqueous solution of hydrogen peroxide with a concentration of 1% by weight or more, preferably 35% by weight, is once vaporized and then condensed to a mist or gas, and the produced mist or gas is sprayed to inner and outer surfaces of the bottle 30. Since the inside of the bottle 30 is sterilized with the mist or the gas of the aqueous solution of hydrogen peroxide, the inner surface of the bottle 30 is sterilized evenly.

The air rinsing device 14 supplies sterile heated air or room-temperature air to the bottle 30, thereby removing foreign matters, the hydrogen peroxide, and so on from the inside of the bottle 30 while activating the hydrogen peroxide.

The sterile water rinsing device 15 rinses the bottle 30, after being sterilized with the hydrogen peroxide as the sterilizer, with sterile water at 15° C. or higher and 85° C. or lower. As a result, the hydrogen peroxide adhering to the bottle 30 is rinsed away, and the foreign matters are removed.

The filling device 20 fills contents, having been sterilized in advance, into the bottles 30 through their mouth portions. The filling device 20 fills the contents into the empty bottles 30. In the filling device 20, the contents are filled into the bottles 30 while the bottles 30 are being rotated (revolved). The contents may be filled into the bottles 30 at room temperature. The contents are sterilized in advance by heating, for example, and are filled into the bottles 30 after being cooled to the room temperature at 3° C. or higher and 40° C. or lower. The contents to be filled by the filling device 20 may be, for example, beverages such as tea and milk beverages.

The cap fitting device 16 fits a cap 33 to the mouth portion of each bottle 30 after the filling of the contents by the filling device 20, thus plugging the bottle 30. In the cap fitting device 16, the mouth portion of the bottle 30 is closed by the cap 33 and is sealed off such that outside air and microbes will not enter the inside of the bottle 30. In the cap fitting device 16, the caps 33 are fitted to the mouth portions of the bottles 30 filled with the contents while the bottles 30 are being rotated (revolved). By fitting the caps 33 to the mouth portions of the bottles 30 as described above, product bottles 35 are obtained.

The caps 33 are sterilized in advance by a cap sterilization device 17. The cap sterilization device 17 is disposed at a position, for example, outside a sterile chamber 40 (described later) and near the cap fitting device 16. In the cap sterilization device 17, the caps 33 having been carried into there from the outside are successively conveyed toward the cap fitting device 16. Midway the conveyance of the caps 33 toward the cap fitting device 16, a mist or gas of hydrogen peroxide is sprayed toward inner and outer surfaces of the caps 33, and the caps 33 are then dried with hot air. As a result, the caps 33 are sterilized.

The product bottle carrying-out unit 22 successively carries out the product bottles 35 including the caps 33 fitted by the cap fitting device 16 toward the outside of the content filling system 10.

The above-described content filling system 10 includes the sterile chamber 40. The sterile chamber 40 includes a sterilization chamber 41 (sub-chamber), a filling chamber 42 (main chamber), and an outlet chamber 43 (sub-chamber). The sterilization chamber 41 (sub-chamber) is disposed on an inlet side of the filling chamber 42 (main chamber), and the outlet chamber 43 (sub-chamber) is disposed on an outlet side of the filling chamber 42 (main chamber). Thus, the sterilization chamber 41, the filling chamber 42, and the outlet chamber 43 are successively disposed in mentioned order along the conveying direction of the bottles 30 from the upstream side toward the downstream side. Furthermore, the bottle sterilization device 11, the air rinsing device 14, and the sterile water rinsing device 15 are disposed in the sterilization chamber 41 while the filling device 20 and the cap fitting device 16 are disposed in the filling chamber 42. The product bottle carrying-out unit 22 is disposed in the outlet chamber 43. The sterilization chamber 41, the filling chamber 42, and the outlet chamber 43 include, respectively, injection nozzles 41a, 42a and 43a (see FIG. 2) for injecting the sterilizer and so on in the form of a mist or a shower when the COP and/or the SOP is performed on the content filling system 10. The content filling system 10 described above may be constituted as, for example, a sterile filling system. In that case, the inside of the sterile chamber 40 is held in a sterile state.

Alternatively, the content filling system 10 may be a high-temperature filling system for filling the contents under high temperature of 85° C. or higher and lower than 100° C. In another example, the content filling system 10 may be a medium-temperature filling system for filling the contents under medium temperature of 55° C. or higher and lower than 85° C.

Figure 1B:
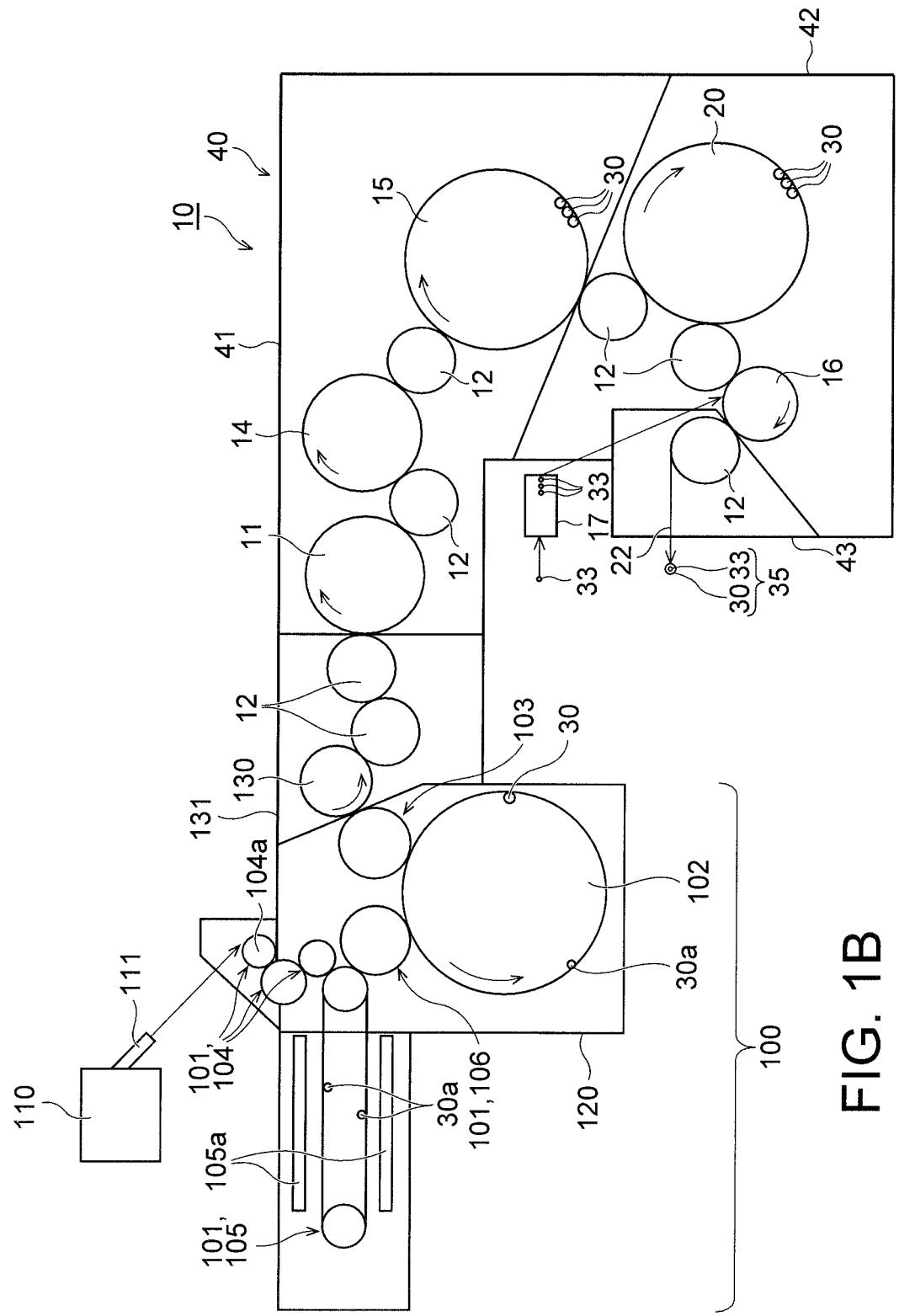
FIG. 1B is a schematic plan view illustrating a modification of the content filling system that is sterilized by the sterilization method according to the first embodiment of the present disclosure.

As illustrated in FIG. 1B, a bottle molding section 100 for molding the bottles 30 with the biaxial stretching blow molding of preforms 30a may be disposed upstream of the bottle sterilization device 11. When the bottle molding section 100 is configured to receive the preforms 30a and to mold the bottles 30 as mentioned above, steps of supplying the preforms 30a, molding the bottles 30, filling the contents into the bottles 30, and plugging the bottles 30 can be continuously performed in the content filling system 10. In such a case, because materials can be conveyed from the outside to the content filling system 10 in the form of preforms 30a with a relatively small volume instead of the bottles 30 with a relatively large volume, conveyance cost can be reduced, and equipment constituting the content filling system 10 can be made more compact.

In an example illustrated in FIG. 1B, the bottle molding section 100 successively receives the preforms 30a from the outside and, after molding of the bottles 30, conveys the molded bottles 30 for supply to the bottle sterilization device 11.

The bottle molding section 100 includes a preform conveying unit 101 for conveying the preforms 30a, a blow molding unit 102 for molding the bottles 30 by performing blow molding on the preforms, and a bottle conveying unit 103 for conveying the molded bottles 30.

From among the above-described units, the preform conveying unit 101 includes a receiving portion 104 for receiving the preforms supplied from a preform supply device 110 through a preform supply conveyor 111, a heating portion 105 for receiving the preforms from the receiving portion 104 and heating the preforms while conveying them, and a transfer portion 106 for receiving the preforms heated by the heating portion 105 and transferring the heated preforms to the blow molding unit 102. From among the above-described portions, the receiving portion 104 is equipped with a preform sterilization device 104a for sterilizing the preforms 30a. The preforms 30a are sterilized (preliminary sterilization) by a mist or gas of the aqueous solution of hydrogen peroxide sprayed from the preform sterilization device 104a. A sterilizer for sterilizing the preforms 30a simply needs to have properties of deactivating microbes. For example, in addition to the hydrogen peroxide, peracetic acid, acetic acid, pernitric acid, nitric acid, chlorine-based chemicals, sodium hydroxide, potassium hydroxide, alcohols such as ethyl alcohol and isopropyl alcohol, chlorine dioxide, ozone water, acidic water, and a surfactant may be used solely or in combination of two or more among them.

The heating portion 105 includes a heater 105a for heating the preforms 30a. The heater 105a may be, for example, an infrared heater. With the heater 105a, the preforms 30a are heated to temperature of about 90° C. or higher and about 130° C. or lower. Temperature at mouth portions of the preforms 30a is held at 70° C. or lower to suppress deformation and so on.

The blow molding unit 102 includes metal molds (not illustrated) and molds the bottles 30 by performing the blow molding on the preforms 30a with the metal molds. The blow molding unit 102 is arranged inside a molding chamber 120.

An adjusting and conveying unit 130 for receiving the bottles 30 from the bottle conveying unit 103 in the bottle molding section 100 and transferring the bottles 30 to the bottle sterilization device 11 is disposed between the bottle molding section 100 and the bottle sterilization device 11. The adjusting and conveying unit 130 is arranged inside an atmosphere shutoff chamber 131. Thus, because the adjusting and conveying unit 130 is arranged inside the atmosphere shutoff chamber 131, gas or a mist of the sterilizer or a mixture of them, generated inside the sterilization chamber 41 in the sterile chamber 40 can be suppressed from flowing into the molding chamber 120 in which the bottle molding section 100 is arranged.

(Sterilization System)

A sterilization system to perform the sterilization method according to this embodiment will be described below with reference to FIG. 2.

Figure 2:
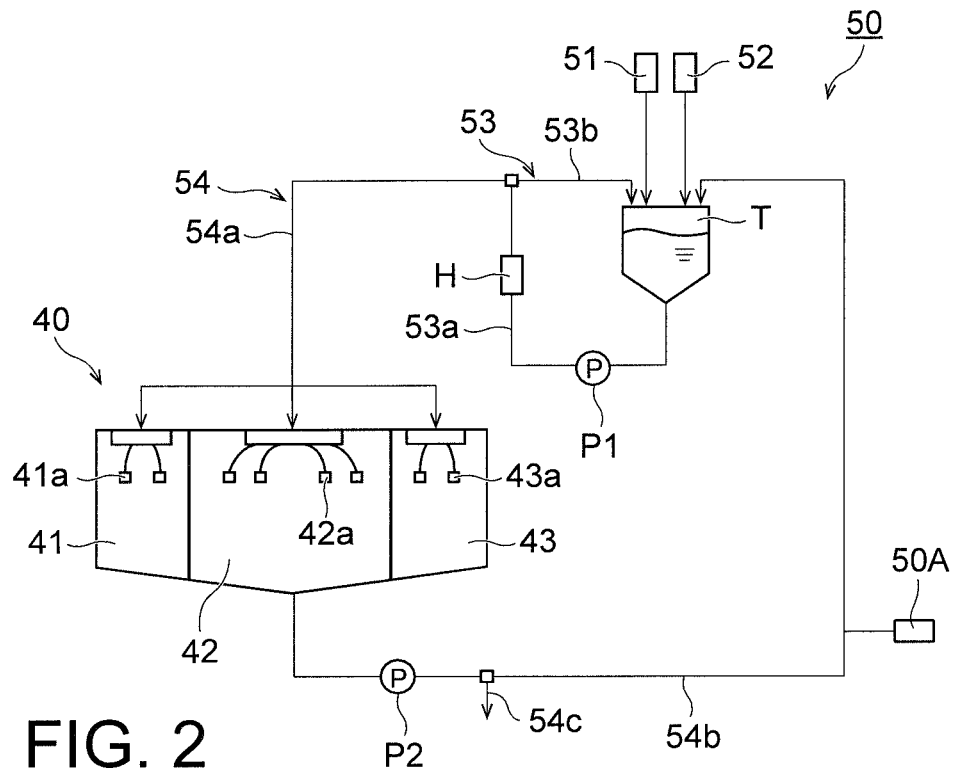
FIG. 2 is a block diagram of a sterilization system performing the sterilization method according to the first embodiment of the present disclosure.

As illustrated in FIG. 2, a sterilization system 50 includes a circulation line 53 in which a heater H for heating the sterilizer is disposed, the filling chamber (main chamber) 42 coupled to the circulation line 53, and a controller 50A connected to the circulation line 53. The sterilization system 50 further includes a tank T coupled to the circulation line 53 and storing the sterilizer, a water supply unit 51 for supplying water to the tank T, a sterilizer concentrate supply unit 52 for supplying a sterilizer concentrate to the tank T, and a supply line 54 disposed between the circulation line 53 and the tank T.

As described above, the tank T stores the sterilizer. Because of the sterilizer being stored in the tank T, the sterilizer can be prepared in advance during, for example, manufacturing of products, and therefore a down time can be shortened. The sterilizer stored in the tank T is prepared from water and the sterilizer concentrate and may be an alkaline detergent, a peracetic detergent, aqueous hydrogen peroxide, or the like as described later.

Depending on the volume of the filling chamber 42 to be sterilized, the volume of the tank T may be, for example, 0.1 $m^3$ or more and 5.0 $m^3$ or less and preferably 1.5 $m^3$ or more and 3.0 $m^3$ or less.

The water supply unit 51 supplies water for use in diluting the sterilizer concentrate to the tank T. The water supplied from the water supply unit 51 may not need to be sterile water. When the water supplied from the water supply unit 51 is not the sterile water, the cost in preparing the sterilizer can be reduced. The water supplied from the water supply unit 51 may be, for example, RO water, pure water, ion exchanged water, or general water (tap water). The water supplied from the water supply unit 51 may have temperature of about 10° C. or higher and about 30° C. or lower. In an example, the temperature of the supplied water may be approximately 15° C.

The sterilizer concentrate supply unit 52 supplies the sterilizer concentrate, used in preparing the sterilizer, to the tank T. The sterilizer concentrate supplied from the sterilizer concentrate supply unit 52 may be an aqueous alkaline solution containing, for example, sodium hydroxide as an alkaline component, an aqueous solution of peracetic acid, aqueous hydrogen peroxide, or the like. In an example, when the sterilizer concentrate is the aqueous alkaline solution containing sodium hydroxide, it may be the aqueous alkaline solution containing about 20% by weight or more and about 50% by weight or less of sodium hydroxide. In another example, when the sterilizer concentrate is the aqueous solution of peracetic acid, it may be the aqueous solution of peracetic acid containing about 10% by weight or more and about 15% by weight or less of peracetic acid. In still another example, when the sterilizer concentrate is the aqueous hydrogen peroxide, it may be the aqueous hydrogen peroxide containing about 0.5% by weight or more and about 35% by weight or less of hydrogen peroxide. Other drugs inactivating microbes, such as potassium hydroxide and sodium hypochlorite, can also be used as the sterilizer concentrate.

The sterilizer prepared from the above-described sterilizer concentrate may contain, for example, about 0.5% by weight or more and about 5% by weight or less of sodium hydroxide. The sterilizer may contain, for example, about 0.15% by weight or more and about 0.4% by weight or less of peracetic acid. The sterilizer may contain, for example, about 0.5% by weight or more and about 35% by weight or less of hydrogen peroxide.

The circulation line 53 serves to circulate the sterilizer stored in the tank T therethrough and to heat the sterilizer up to a desired temperature. The heater H for heating the sterilizer is disposed in the circulation line 53. In more detail, the circulation line 53 includes a first supply pipe 53a coupled to the tank T, and a first feedback pipe 53b coupled to the first supply pipe 53a. From among those pipes, the first supply pipe 53a serves to supply the sterilizer from the tank T. The above-mentioned heater H and a pump P1 for circulating the sterilizer are disposed in the first supply pipe 53a. On the other hand, the first feedback pipe 53b serves to return the sterilizer having passed through the first supply pipe 53a to the tank T. The first feedback pipe 53b is coupled to the tank T. The above-mentioned heater H may be disposed in the first feedback pipe 53b.

The supply line 54 sends the sterilizer having been heated while passing through the circulation line 53 toward the downstream side. The sterile chamber 40 (i.e., the sterilization chamber 41, the filling chamber 42, and the outlet chamber 43) are disposed in the supply line 54. In more detail, the supply line 54 includes a second supply pipe 54a coupled to both the first supply pipe 53a and the first feedback pipe 53b in the circulation line 53 and disposed upstream of the sterile chamber 40, a second feedback pipe 54b coupled to the sterile chamber 40 and disposed downstream of the sterile chamber 40, and a drainpipe 54c coupled to the second feedback pipe 54b. From among those pipes, the second supply pipe 54a is branched into multiple pipes on an upstream side of the sterile chamber 40 such that the sterilizer can be supplied to the sterilization chamber 41, the filling chamber 42, and the outlet chamber 43 in the sterile chamber 40 independently of one another. The second feedback pipe 54b serves not only to discharge the sterilizer from the sterile chamber 40, but also to return the sterilizer having passed through the sterile chamber 40 to the tank T. The second feedback pipe 54b is coupled to the tank T. A pump P2 for returning the sterilizer to the tank T is disposed in the second feedback pipe 54b. The drainpipe 54c serves to discharge the sterilizer as a waste liquid to the outside after the sterilization of the sterile chamber 40.

The controller 50A controls the content filling system 10. The controller 50A is configured to control the water supply unit 51, the sterilizer concentrate supply unit 52, and the pumps P1 and P2. The controller 50A causes the sterilizer to circulate through the circulation line 53 while the sterilizer is being heated by the heater H. Moreover, the controller 50A causes the sterilizer heated by the heater H to be supplied to the filling chamber (main chamber) 42.

Although not illustrated, valves or the likes for switching flow paths are disposed in the circulation line 53 and the supply line 54 (both being hereinafter referred to simply as the "circulation line 53 and so on"). Although not illustrated, thermometers are also disposed in the circulation line 53 and so on. Temperature information measured by the thermometers is sent to the controller 50A. In addition to the above-mentioned valves and thermometers (not illustrated) or actuators (not illustrated), various meters such as flow meters and densitometers, various selector valves, filters, etc. are further disposed in the circulation line 53 and so on. Those components are also controlled in accordance with signals from the controller 50A.

(Sterilization Method)

Figure 3:
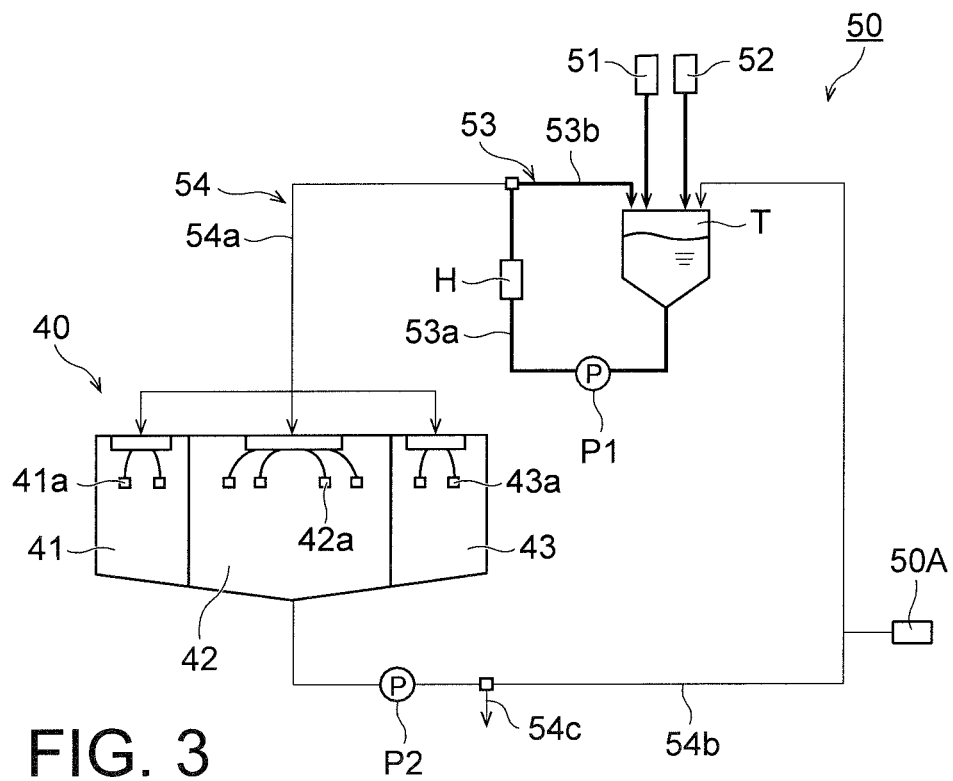
FIG. 3 is a block diagram illustrating the sterilization method according to the first embodiment of the present disclosure.
Figure 4:
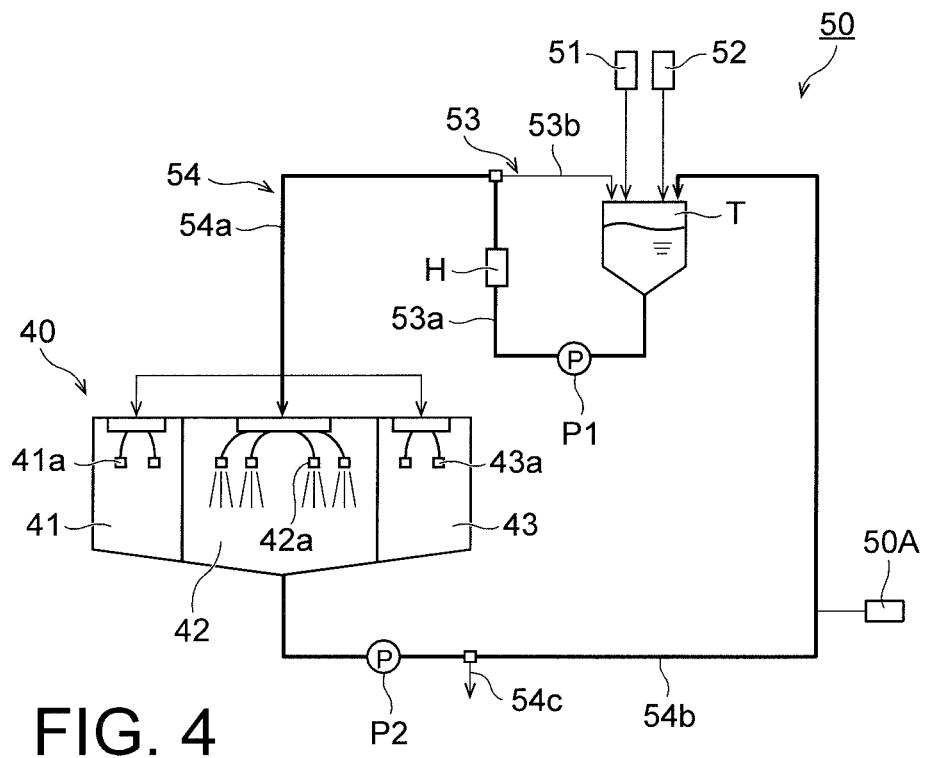
FIG. 4 is a block diagram illustrating the sterilization method according to the first embodiment of the present disclosure.
Figure 5:
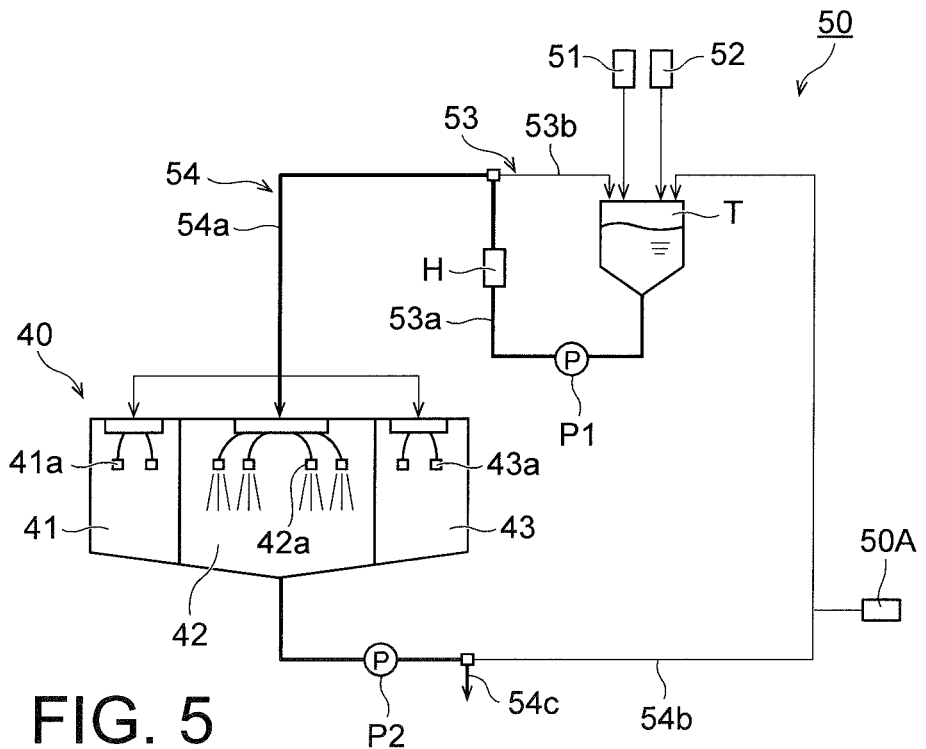
FIG. 5 is a block diagram illustrating the sterilization method according to the first embodiment of the present disclosure.

Operation of this embodiment will be described below. The sterilization method using the sterilization system 50 is described here with reference to FIGS. 3 to 5. The sterilization method according to this embodiment can be suitably applied to, for example, the COP and the SOP of the content filling system 10, which may be performed after the CIP and the SIP of the content filling system 10. In FIGS. 3 to 5, the pipes and so on through which the water, the sterilizer concentrate, or the sterilizer pass are denoted by thick lines.

First, an operation button of the controller 50A is operated. In response to the operation of the button, the water is supplied to the tank T from the water supply unit 51. The sterilizer concentrate is also supplied to the tank T from the sterilizer concentrate supply unit 52. Thus, the sterilizer concentrate is diluted with the water in the tank T, and the sterilizer is prepared. Here, the sterilizer may be an aqueous alkaline solution containing about 0.5% by weight or more and about 5% by weight or less of sodium hydroxide, or an aqueous solution of peracetic acid containing about 0.15% by weight or more and about 0.4% by weight or less of peracetic acid. Alternatively, the sterilizer may be the aqueous hydrogen peroxide containing about 0.5% by weight or more and about 35% by weight or less of hydrogen peroxide.

(Circulation Step)

Then, the sterilizer is circulated through the circulation line 53 while the sterilizer is being heated by the heater H. On that occasion, the sterilizer in the tank T is circulated through the circulation line 53 while the sterilizer is being heated by the heater H. In this embodiment, the pump P1 in the circulation line 53 is driven, and the sterilizer supplied to the tank T is circulated through the circulation line 53 (see FIG. 3). Here, the first supply pipe 53a and the first feedback pipe 53b are communicated with each other through a valve (not illustrated). On the other hand, the first supply pipe 53a and the second supply pipe 54a in the supply line 54 are not communicated with each other. Thus, the sterilizer is not supplied to the filling chamber 42 until the sterilizer is heated up to the desired temperature. Accordingly, as described later, even when microorganism survive in the sterilizer prepared in the tank T, the sterilizer with the microorganism surviving therein is suppressed from being supplied to the filling chamber 42 and so on.

During the circulation of the sterilizer through the circulation line 53, the heater H in the circulation line 53 is driven, and the sterilizer is heated by the heater H. The sterilizer is heated up to temperature of, for example, 40° C. or higher and 90° C. or lower, preferably 50° C. or higher and 80° C. or lower, and more preferably 60° C. or higher and 80° C. or lower. A circulation time for the sterilizer to circulate through the circulation line 53 may be 5 min or longer and 60 min or shorter. When the circulation time of the sterilizer is 5 min or longer, the sterilizer can be easily heated up to the desired temperature without installing a large-sized heater or multiple heaters. When the circulation time of the sterilizer is 60 min or shorter, the sterilization time can be suppressed from becoming too long, and the down time can be shortened.

Although depending on the power of the heater H and the capacity of the tank T, the supply of the water and the sterilizer concentrate to the tank T and the circulation of the sterilizer through the circulation line 53 may be started at timing during the filling of beverages in the content filling system 10 or during the CIP or the SIP of the content filling system 10. After the end of production of the beverages, preparations for cleaning, such as recovering packing materials (the bottles 30 and the caps 33) remaining in the filling chamber 42 and so on, are performed in some cases prior to starting the COP or the SOP of the filling chamber 42. In such a case, the sterilizer is preferably adjusted to a predetermined concentration and circulated under heating to the desired temperature during the preparation for cleaning. Thus, according to this embodiment, since the sterilizer in the tank T can be previously heated up to the desired temperature during, for example, the CIP or the SIP of the content filling system 10, the down time in the sterilization process can be shortened.

(Sterilization Step)

Then, the filling chamber (main chamber) 42 is sterilized by supplying the sterilizer having been heated by the heater H to the filling chamber (main chamber) 42. On that occasion, the sterilizer having been heated by the heater H is supplied to the filling chamber 42 through the supply line 54. In this embodiment, an operation button of the controller 50A is first operated. In response to the operation of the button, a valve (not illustrated) is switched, whereby the first supply pipe 53a and the second supply pipe 54a are communicated with each other. Then, as illustrated in FIG. 4, the sterilizer is supplied from the tank T to the second supply pipe 54a of the supply line 54 through the first supply pipe 53a of the circulation line 53. At that time, the sterilizer may be further heated by the heater H.

Then, the sterilizer supplied to the second supply pipe 54a passes through the second supply pipe 54a and is supplied to the filling chamber 42 in the sterile chamber 40. On that occasion, the sterilizer is injected into the filling chamber 42 from the injection nozzle 42a disposed in the filling chamber 42. When the filling chamber 42 has a volume of about 10 m$^3$ or more and about 170 m$^3$ or less, for example, a supply amount of the sterilizer may be about 10 m$^3$/h or more and about 50 m$^3$/h or less and preferably about 15 m$^3$/h or more and about 30 m$^3$/h or less. The sterilizer may be further supplied to the sterilization chamber 41 and the outlet chamber 43 in the sterile chamber 40.

There is a possibility that microorganism may survive in the water supplied from the water supply unit 51 from the stage before being supplied. Some of those microorganisms have resistance to the component of the sterilizer. For instance, when the sterilizer contains peracetic acid, examples of microorganism with resistance to the peracetic acid are *Bacillus cereus, B. polymyxa, B. megaterium, Paenibacillus chibensis, P. favisporus*, and *Chaetomium globosum*. When microorganism have resistance to the component of the sterilizer like the above-mentioned examples, there is a possibility that the microorganism may survive in the sterilizer prepared in the tank T, and that, even when the filling chamber 42 is sterilized with the sterilizer, the microorganism in the sterilizer may remain in the filling chamber 42. Particularly, when the temperature or the concentration of the sterilizer is low, or when the sterilization time is short, the microorganism with resistance to the component of the sterilizer are difficult to kill, and a possibility of those microorganisms surviving in the sterilizer increases.

According to this embodiment, however, the sterilizer supplied to the filling chamber 42 is heated by the heater H disposed in the circulation line 53, and the sterilizer is held at the desired temperature. Thus, because of the sterilizer being heated up to the desired temperature, even when the microorganism with resistance to the component of the sterilizer survive in the water supplied to the tank T from the stage before being supplied, those microorganisms can be killed.

When the sterilizer is supplied to the filling chamber 42, the temperature of the sterilizer may be 40° C. or higher and 90° C. or lower, preferably 50° C. or higher and 80° C. or lower, and more preferably 60° C. or higher and 70° C. or lower. With the temperature of the sterilizer being 40° C. or higher, even when the microorganism with resistance to the component of the sterilizer survive in the water supplied to the tank T from the stage before being supplied, those microorganisms can be efficiently killed. Particularly, with the temperature of the sterilizer being 60° C. or higher, even when the sterilizer contains peracetic acid and microorganism with resistance to the peracetic acid survive in the water supplied to the tank T, those microorganisms can be efficiently killed. With the temperature of the sterilizer being 90° C. or lower, energy saving and cost reduction can be realized. Moreover, with the temperature of the sterilizer being 80° C. or lower, decomposition of the component (e.g., peracetic acid) contained in the sterilizer can be suppressed. On the other hand, depending on the case, namely when the decomposition of the component contained in the sterilizer can be suppressed with an additive or the like, or depending on the type of the sterilizer used, the temperature of the sterilizer may be 70° C. or higher and 90° C. or lower and preferably 75° C. or higher and 90° C. or lower. With the temperature of the sterilizer being 70° C. or higher, particularly 75° C. or higher, even when the microorganism with resistance to the component of the sterilizer survive in the water supplied to the tank T from the stage before being supplied, those microorganisms can be efficiently killed.

(Recovery Step)

Then, the sterilizer having been supplied to the filling chamber 42 is returned to the tank T. On that occasion, the pump P2 in the supply line 54 is driven, and the sterilizer having been supplied to the filling chamber 42 is delivered to the second feedback pipe 54b as illustrated in FIG. 4. Then, the sterilizer having been delivered to the second feedback pipe 54b passes through the second feedback pipe 54b and is returned to the tank T. In such a manner, the heated sterilizer is circulated through the first supply pipe 53a of the circulation line 53 and the supply line 54 for a predetermined time.

Thereafter, as illustrated in FIG. 5, the sterilizer is discharged as a waste liquid to the outside through the drainpipe 54c disposed in the second feedback pipe 54b of the supply line 54. Note that the sterilizer having been delivered to the second feedback pipe 54b from the filling chamber 42 may be discharged as the waste liquid to the outside through the drainpipe 54c without performing the above-mentioned recovery step. In other words, the sterilizer having been delivered to the second feedback pipe 54b from the filling chamber 42 may not need to be returned to the tank T.

According to this embodiment, as described above, the sterilization method includes the circulation step of circulating the sterilizer through the circulation line 53 while the sterilizer is being heated by the heater H, and the sterilization step of sterilizing the filling chamber (main chamber) 42 by supplying, to the filling chamber 42, the sterilizer heated by the heater H. Therefore, the sterilizer heated up to the desired temperature can be supplied to the filling chamber 42. Accordingly, even when the microorganism with resistance to the component of the sterilizer survive in the sterilizer from the beginning, those microorganisms can be killed. As a result, even when the microorganism with resistance to the component of the sterilizer survive in the sterilizer from the beginning, reduction in sterilization effect of the sterilizer can be suppressed.

According to this embodiment, in the circulation step, the sterilizer in the tank T is circulated through the circulation line 53 while the sterilizer is being heated by the heater H, and in the sterilization step, the sterilizer heated by the heater H is supplied to the filling chamber 42 through the supply line 54. Therefore, the sterilizer heated up to the desired temperature can be supplied to the filling chamber 42. Accordingly, even when the microorganism with resistance to the component of the sterilizer survive in the water supplied to the tank T from the stage before being supplied, those microorganisms can be killed. As a result, even when the microorganism with resistance to the component of the sterilizer survive in the water supplied to the tank T from the stage before being supplied, the reduction in sterilization effect of the sterilizer can be suppressed.

According to this embodiment, the sterilization method further includes the recovery step of returning, to the tank T, the sterilizer supplied to the filling chamber 42. In other words, the filling chamber 42 can be sterilized while the sterilizer in the tank T is circulated through the first supply pipe 53*a* of the circulation line 53 and the supply line 54. Accordingly, an amount of the sterilizer used can be reduced, and the cost in sterilizing the filling chamber 42 can be reduced.

According to this embodiment, the sterilizer contains peracetic acid. Thus, even when the sterilizer is an aqueous solution of peracetic acid like such a case, the microorganism with resistance to the peracetic acid can be effectively killed in this embodiment. As a result, the reduction in sterilization effect of the sterilizer can be suppressed.

According to this embodiment, the sterilizer is further heated by the heater H in the sterilization step. This can suppress the temperature of the sterilizer from reducing when the sterilizer is supplied to the filling chamber 42. In other words, the sterilizer in a high temperature state can be supplied to the filling chamber 42. As a result, the sterilization effect of the sterilizer can be increased.

While the above embodiment has been described in connection with an example in which the sterile chamber 40 includes the filling chamber 42 (main chamber) in which the filling device for filling the contents into the bottles is disposed, the sterilization chamber 41 (sub-chamber) disposed on the inlet side of the filling chamber 42, and the outlet chamber 43 (sub-chamber) disposed on the outlet side of the filling chamber 42, the present disclosure is not limited to that example. In another example, although not illustrated, the sterile chamber 40 may include only one of the sterilization chamber 41 (sub-chamber) disposed on the inlet side of the filling chamber 42 and the outlet chamber 43 (sub-chamber) disposed on the outlet side of the filling chamber 42.

Another additional step may be performed between the steps in the above-described embodiment. For instance, a rinsing step of rinsing the inside of the second supply pipe 54*a* of the supply line 54 with the sterilizer heated by the heater H may be performed between the circulation step and the sterilization step. There is a possibility that the inside of the second supply pipe 54*a* is not maintained in the sterile state. This implies a possibility that microorganism may mix into the water remaining in the second supply pipe 54*a* after the SOP in the preceding cycle, and that the microorganism may have grown in the second supply pipe 54*a* during the production of the beverages after the SOP in the preceding cycle. Even in such a situation, by rinsing the inside of the second supply pipe 54*a* prior to the sterilization step, those microorganisms can be suppressed from mixing into the filling chamber 42 and so on.

Figure 6A:
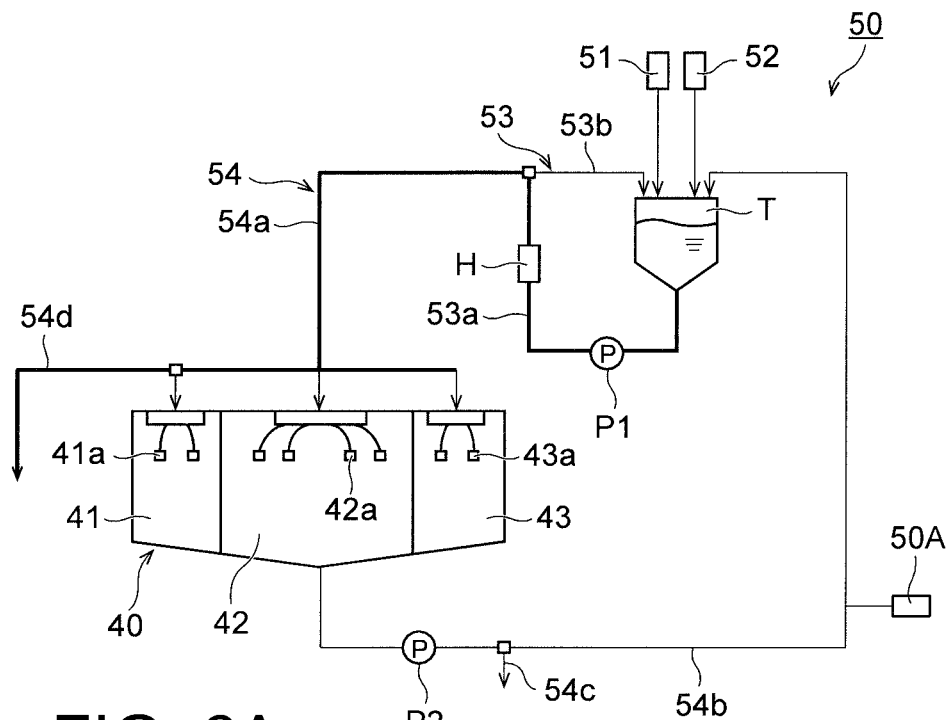
FIG. 6A is a block diagram illustrating a modification of the sterilization method according to the first embodiment of the present disclosure.

In starting the rinsing step, an operation button (not illustrated) of the controller 50A is operated after the circulation step. With the operation of the button, the valve (not illustrated) is switched, whereupon the first supply pipe 53*a* and the second supply pipe 54*a* are communicated with each other. Moreover, at that time, one of valves or the likes (not illustrated) disposed in the second supply pipe 54*a*, the one being positioned closest to the sterile chamber 40, is switched such that the sterile chamber 40 and the second supply pipe 54*a* are not communicated with each other. Then, as illustrated in FIG. 6A, the sterilizer is supplied from the tank T to the second supply pipe 54*a* of the supply line 54 through the first supply pipe 53*a* of the circulation line 53. On that occasion, the sterilizer may be further heated by the heater H.

Then, the sterilizer having been supplied to the second supply pipe 54*a* passes through the second supply pipe 54*a* and is discharged as a waste liquid to the outside through a drainpipe 54*d* coupled to the second supply pipe 54*a*.

In the above-described rinsing step, a volume of the sterilizer used to rinse the second supply pipe 54*a* is preferably at least once or more and 5 times or less than that of a sterilizer flow path in the second supply pipe 54*a*. When the volume of the sterilizer used is once or more than that of the sterilizer flow path in the second supply pipe 54*a*, the water used in the SOP in the preceding cycle and remaining in the second supply pipe 54*a* can be effectively removed. When the volume of the sterilizer used is 5 times or less than that of the sterilizer flow path in the second supply pipe 54*a*, an amount of the sterilizer used can be reduced, and the cost of the rinsing step can be reduced.

Thus, by performing the rinsing step between the circulation step and the sterilization step, the microorganism surviving in the second supply pipe 54*a* can be suppressed from mixing into the filling chamber 42 and so on. In addition, by performing the rinsing step between the circulation step and the sterilization step, the second supply pipe 54*a* can be heated with the sterilizer heated by the heater H. Accordingly, a temperature fall of the sterilizer in the second supply pipe 54*a* can also be suppressed when the sterilizer is supplied to pass through the second supply pipe 54*a* in the sterilization step.

The sterilization method may further include, prior to the above-described sterilization step, a cleaning step of cleaning the filling chamber 42 by supplying an alkaline detergent to the filling chamber (main chamber) 42.

Figure 6B:
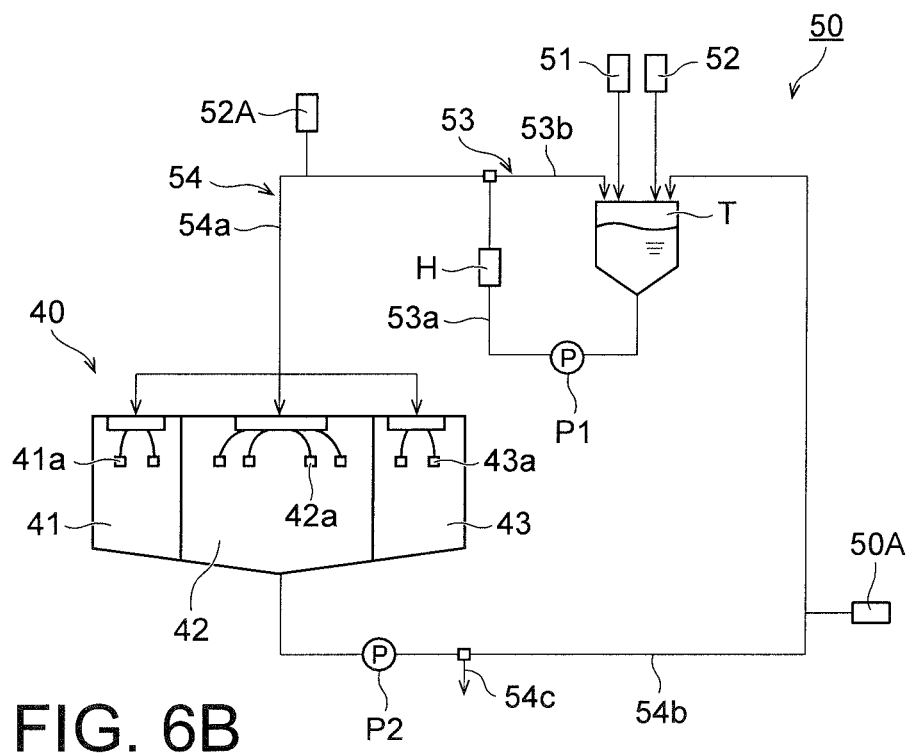
FIG. 6B is a block diagram illustrating a modification of the sterilization method according to the first embodiment of the present disclosure.

In the above case, as illustrated in FIG. 6B, the sterilization system 50 may further include an alkaline detergent supply unit 52A for supplying the alkaline detergent to the supply line 54.

The alkaline detergent supplied from the alkaline detergent supply unit 52A may be an alkaline aqueous solution containing about 0.5% by weight or more and about 5% by weight or less of sodium hydroxide.

In starting the cleaning step, an operation button (not illustrated) of the controller 50A is operated during the circulation step or prior to the circulation step. With the operation of the button, the valve (not illustrated) is switched such that the first supply pipe 53*a* and the second supply pipe 54*a* are not communicated with each other by switching of the valve or the like (not illustrated). The alkaline detergent is then supplied from the alkaline detergent supply unit 52A to the second supply pipe 54*a* of the supply line 54.

The alkaline detergent supplied to the second supply pipe 54*a* passes through the second supply pipe 54*a* and is supplied to the filling chamber 42 in the sterile chamber 40. On that occasion, the alkaline detergent is injected into the filling chamber 42 through the injection nozzle 42*a* disposed in the filling chamber 42. When the filling chamber 42 has a volume of about 10 m$^3$ or more and about 170 m$^3$ or less, for example, a supply amount of the alkaline detergent may be about 10 m$^3$/h or more and about 50 m$^3$/h or less and preferably about 15 m³/h or more and about 40 m³/h or less. The alkaline detergent may be further supplied to the sterilization chamber 41 and the outlet chamber 43 in the sterile chamber 40.

When the alkaline detergent is supplied to the filling chamber 42, the alkaline detergent may have temperature of 15° C. or higher and 99° C. or lower and preferably 40° C. or higher and 80° C. or lower.

Then, the pump P2 in the supply line 54 is driven, and the alkaline detergent supplied to the filling chamber 42 is delivered to the second feedback pipe 54b. The alkaline detergent supplied to the second feedback pipe 54b is discharged as a waste liquid to the outside through the drainpipe 54c disposed in the second feedback pipe 54b.

As described above, by, prior to the sterilization step, supplying the alkaline detergent to the filling chamber (main chamber) 42 and performing the cleaning step to clean the filling chamber 42, the filling chamber 42 can be cleaned prior to the sterilization step. As a result, the sterilization effect of the sterilizer can be increased.

Figure 6C:
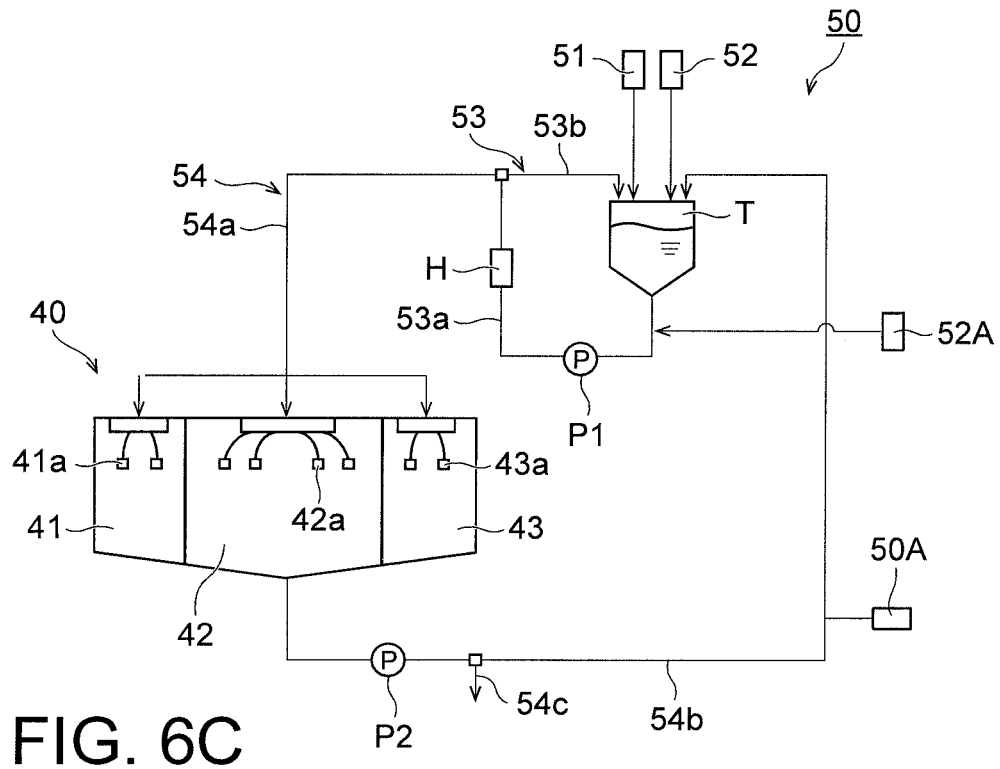
FIG. 6C is a block diagram illustrating a modification of the sterilization method according to the first embodiment of the present disclosure.

The above embodiment has been described in connection with an example in which the alkaline detergent supply unit 52A in the sterilization system 50 supplies the alkaline detergent to the supply line 54, but the present disclosure is not limited to that example. In another example, as illustrated in FIG. 6C, the alkaline detergent supply unit 52A may supply the alkaline detergent to the first supply pipe 53a of the circulation line 53. In such a case, the cleaning step is preferably performed prior to the circulation step.

The above embodiment has been described in connection with an example in which the sterilizer is newly prepared by diluting the sterilizer concentrate supplied from the sterilizer concentrate supply unit 52 with the water supplied from the water supply unit 51, but the present disclosure is not limited to that example. In another example, although not illustrated, the sterilizer having been used to perform the sterilization in the sterilization system 50 in the preceding cycle may be reserved for reuse (or multi-use) in the tank T or another recovery tank without being discharged.

The above embodiment has been described in connection with an example in which the content filling system 10 includes the bottle supply section 21, the bottle sterilization device 11, the air rinsing device 14, the sterile water rinsing device 15, the filling device 20, the cap fitting device 16, and the product bottle carrying-out unit 22, but the present disclosure is not limited to that example. In another example, although not illustrated, the content filling system 10 may not need to include the sterile water rinsing device 15.

Second Embodiment

A second embodiment will be described below with reference to FIGS. 7 to 10. The second embodiment illustrated in FIGS. 7 to 10 is mainly different from the first embodiment in that, during the circulation step, the sterilizer in the tank T is circulated via the sterilization chamber 41 and the outlet chamber 43. The same components in FIGS. 7 to 10 as those in the first embodiment are denoted by the same reference signs, and detailed description of those components is omitted.

(Sterilization System)

First, a sterilization system to perform a sterilization method according to this embodiment will be described below with reference to FIG. 7.

Figure 7:
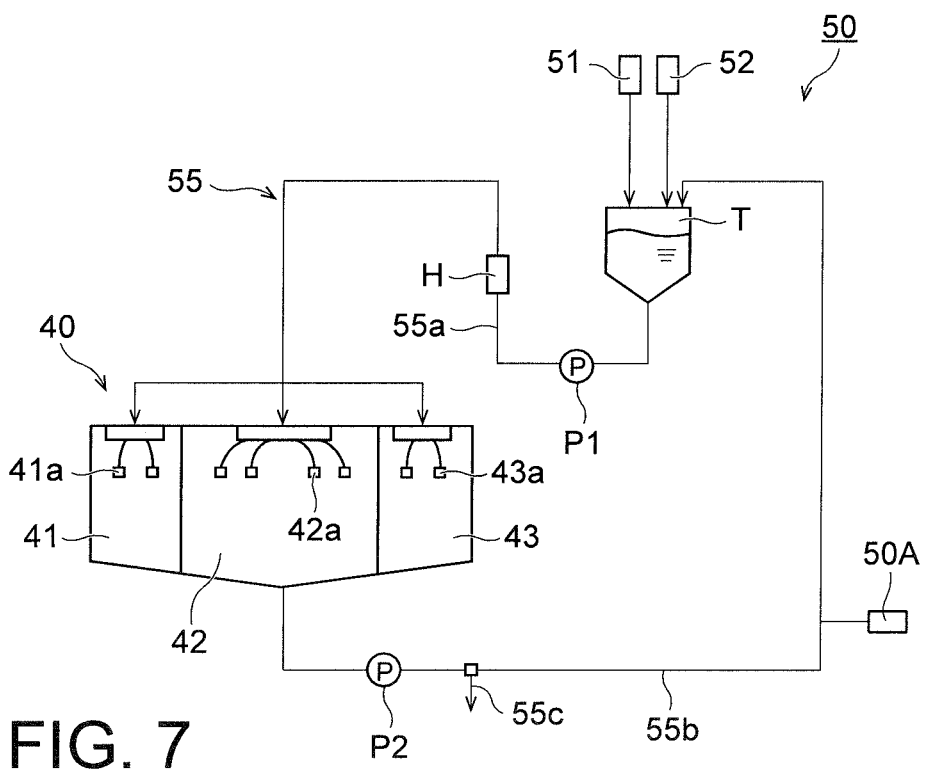
FIG. 7 is a block diagram of a sterilization system performing a sterilization method according to a second embodiment of the present disclosure.

As illustrated in FIG. 7, a sterilization system 50 includes a tank T coupled to a circulation line 55 and storing the sterilizer, a water supply unit 51 for supplying water to the tank T, a sterilizer concentrate supply unit 52 for supplying a sterilizer concentrate to the tank T.

The circulation line 55 serves to circulate the sterilizer stored in the tank T therethrough and to heat the sterilizer up to a desired temperature. A heater H for heating the sterilizer and a sterile chamber 40 are successively disposed in the circulation line 55. In more detail, the circulation line 55 includes a supply pipe 55a coupled to the tank T and disposed upstream of the sterile chamber 40, a feedback pipe 55b coupled to the sterile chamber 40 and disposed downstream of the sterile chamber 40, and a drainpipe 55c coupled to the feedback pipe 55b. From among those pipes, the supply pipe 55a is branched into multiple pipes on an upstream side of the sterile chamber 40 such that the sterilizer can be supplied to the sterilization chamber 41 (sub-chamber), the filling chamber 42 (main chamber), and the outlet chamber 43 (sub-chamber) in the sterile chamber 40 independently of one another. The feedback pipe 55b serves not only to discharge the sterilizer from the sterile chamber 40, but also to return the sterilizer having passed through the sterile chamber 40 to the tank T. The feedback pipe 55b is coupled to the tank T. A pump P2 for returning the sterilizer to the tank T is disposed in the feedback pipe 55b. The drainpipe 55c serves to discharge the sterilizer after the sterilization of the sterile chamber 40.

Although not illustrated, in addition to valves for switching flow paths, thermometers, and/or actuators, various meters such as flow meters and densitometers, various selector valves, filters, etc. are further disposed in the circulation line 55 as well. Those components are also controlled in accordance with signals from a controller 50A.

(Sterilization Method)

Figure 8:
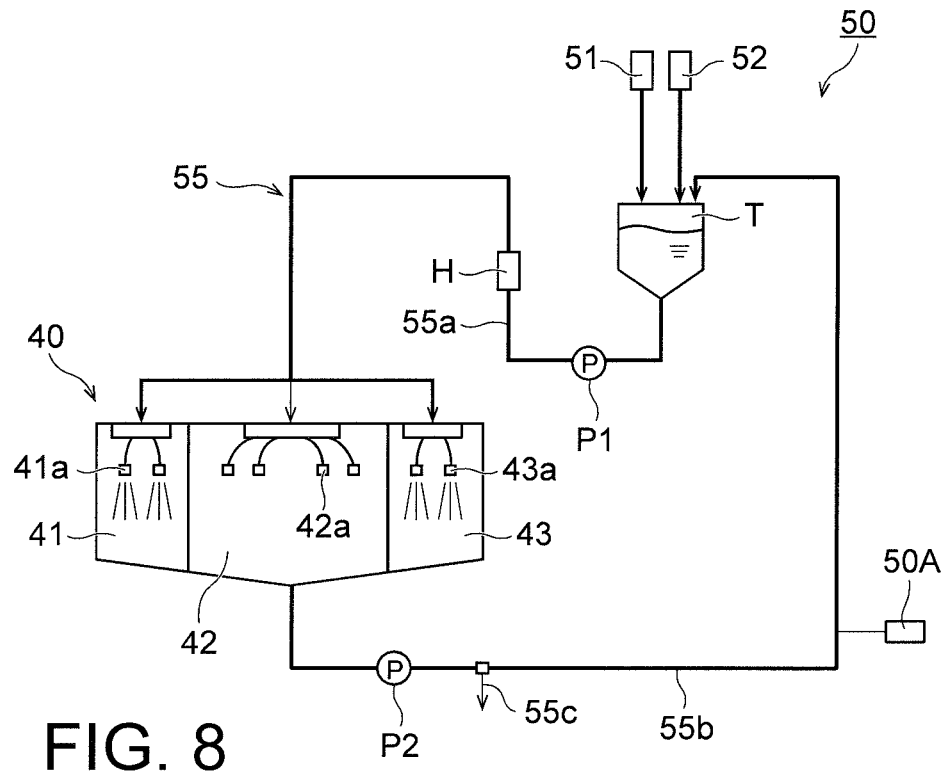
FIG. 8 is a block diagram illustrating the sterilization method according to the second embodiment of the present disclosure.

The sterilization method according to this embodiment will be described below with reference to FIGS. 8 to 10.

First, an operation button of the controller 50A is operated. In response to the operation of the button, the water is supplied to the tank T from the water supply unit 51. The sterilizer concentrate is also supplied to the tank T from the sterilizer concentrate supply unit 52. Thus, the sterilizer concentrate is diluted with the water in the tank T, and the sterilizer is prepared.

(Circulation Step)

Then, the sterilizer is circulated through the circulation line 55 while the sterilizer is being heated by the heater H. On that occasion, the sterilizer in the tank T is circulated through the circulation line 55 via the sterilization chamber 41 (sub-chamber) and the outlet chamber 43 (sub-chamber) while the sterilizer is being heated by the heater H. In this embodiment, the pump P1 and the pump P2 in the circulation line 55 are driven, and the sterilizer supplied to the tank T is circulated through the circulation line 55 (see FIG. 8). Here, the supply pipe 55a is communicated with the sterilization chamber 41 and the outlet chamber 43 through valves (not illustrated). Thus, the sterilizer supplied to the supply pipe 55a of the circulation line 55 passes through the supply pipe 55a and is supplied to the sterilization chamber 41 (sub-chamber) and the outlet chamber 43 (sub-chamber) in the sterile chamber 40. At that time, the sterilizer is injected into the sterilization chamber 41 and the outlet chamber 43 from injection nozzles 41a and 43a that are disposed respectively in the sterilization chamber 41 and the outlet chamber 43. On the other hand, the supply pipe 55a is not communicated with the filling chamber 42. Thus, the sterilizer is not supplied to the filling chamber 42 until the sterilizer is heated up to the desired temperature. Accordingly, even when microorganism survive in the sterilizer prepared in the tank T, the sterilizer with the microorganism surviving therein is suppressed from being supplied to the filling chamber 42.

(Sterilization Step)

Then, the filling chamber (main chamber) 42 is sterilized by supplying the sterilizer having been heated by the heater H to the filling chamber (main chamber) 42. On that occasion, the sterilizer having been heated by the heater H is supplied to the filling chamber 42 (main chamber) through the circulation line 55. In this embodiment, an operation button of the controller 50A is first operated. In response to the operation of the button, a valve (not illustrated) is switched, whereby the supply pipe 55a of the circulation line 55 and the filling chamber 42 are communicated with each other.

Figure 9:
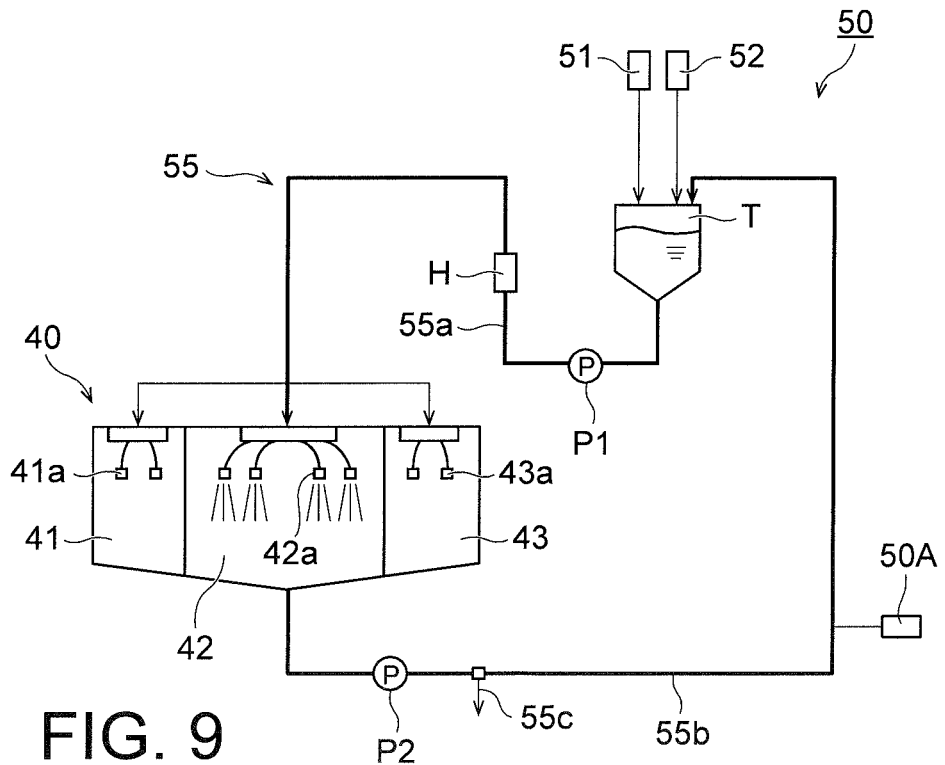
FIG. 9 is a block diagram illustrating the sterilization method according to the second embodiment of the present disclosure.

Then, as illustrated in FIG. 9, the sterilizer supplied from the tank T to the supply pipe 55a of the circulation line 55 is supplied to the filling chamber 42 (main chamber) in the sterile chamber 40. At that time, the sterilizer may be further supplied to the sterilization chamber 41 and the outlet chamber 43 in the sterile chamber 40.

(Recovery Step)

Then, the sterilizer having been supplied to the filling chamber 42 is returned to the tank T. On that occasion, the pump P2 in the circulation line 55 is driven, and the sterilizer having been supplied to the filling chamber 42 is delivered to the feedback pipe 55b as illustrated in FIG. 9. Then, the sterilizer having been delivered to the feedback pipe 55b passes through the feedback pipe 55b and is returned to the tank T. In such a manner, the heated sterilizer is circulated through the circulation line 55 via the filling chamber 42 for a predetermined time.

Figure 10:
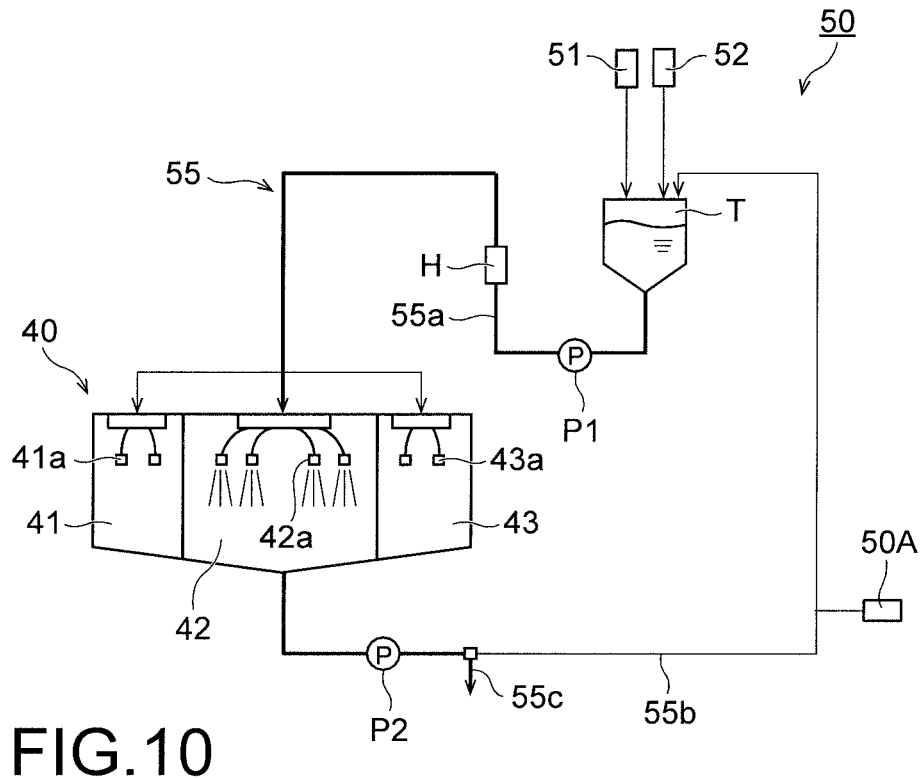
FIG. 10 is a block diagram illustrating the sterilization method according to the second embodiment of the present disclosure.

Thereafter, as illustrated in FIG. 10, the sterilizer is discharged as a waste liquid to the outside through the drainpipe 55c disposed in the feedback pipe 55b of the circulation line 55. Note that the sterilizer having been delivered to the feedback pipe 55b from the filling chamber 42 may be discharged as the waste liquid to the outside through the drainpipe 55c without performing the above-described recovery step. In other words, the sterilizer having been delivered to the feedback pipe 55b from the filling chamber 42 may not need to be returned to the tank T.

According to this embodiment, as described above, in the circulation step, the sterilizer in the tank T is circulated through the circulation line 55 via the sterilization chamber 41 (sub-chamber) and the outlet chamber 43 (sub-chamber) while the sterilizer is being heated by the heater H, and in the sterilization step, the sterilizer having been heated by the heater H is supplied to the filling chamber 42 (main chamber) through the circulation line 55. Also in this case, the sterilizer heated up to the desired temperature can be supplied to the filling chamber 42. Accordingly, even when the microorganism with resistance to the component of the sterilizer survive in the water supplied to the tank T from the stage before being supplied, those microorganisms can be killed. As a result, even when the microorganism with resistance to the component of the sterilizer survive in the water supplied to the tank T from the stage before being supplied, the reduction in sterilization effect of the sterilizer can be suppressed.

The above embodiment has been described in connection with an example in which the sterilization system 50 includes the circulation line 55, but the present disclosure is not limited to that example. In another example, although not illustrated, the sterilization system 50 may include the circulation line 53 and the supply line 54 as in the embodiment illustrated in FIG. 2. In such a case, the sterilizer in the tank T may be circulated in the above-described circulation step through, for example, the first supply pipe 53a of the circulation line 53 (see FIG. 2), the second supply pipe 54a of the supply line 54, the sterilization chamber 41 (sub-chamber) and/or the outlet chamber 43 (sub-chamber), and the second feedback pipe 54b of the supply line 54. In other words, in the circulation step, the first feedback pipe 53b of the circulation line 53 may not need to be used.

The above embodiment has been described in connection with an example in which the sterilizer in the tank T is circulated in the circulation step through the circulation line 55 via the sterilization chamber 41 (sub-chamber) and the outlet chamber 43 (sub-chamber) while the sterilizer is being heated by the heater H, but the present disclosure is not limited to that example. In another example, although not illustrated, the sterilizer in the tank T may be circulated in the circulation step through the circulation line 55 via only one of the sterilization chamber 41 (sub-chamber) and the outlet chamber 43 (sub-chamber).

Alternatively, in the circulation step, the sterilizer in the tank T may be circulated through the circulation line 55 via a cap sterilization device 17. In this case, with a configuration that the cap sterilization device 17 is disposed in the circulation line 55, the sterilizer in the tank T can be circulated through the circulation line 55 via the cap sterilization device 17.

When the content filling system 10 includes a bottle molding section 100 (see FIG. 1B), the sterilizer in the tank T may be circulated in the circulation step through the circulation line 55 via, for example, at least one of a molding chamber 120 and an atmosphere shutoff chamber 131 in the bottle molding section 100. In this case, with a configuration that the molding chamber 120 and the atmosphere shutoff chamber 131 are disposed in the circulation line 55, the sterilizer in the tank T can be circulated through the circulation line 55 via at least one of the molding chamber 120 and the atmosphere shutoff chamber 131.

Third Embodiment

A third embodiment will be described below with reference to FIGS. 11 to 14. The third embodiment illustrated in FIGS. 11 to 14 is mainly different from the first embodiment in that the sterilization system 50 does not include the tank T. The same components in FIGS. 11 to 14 as those in the first embodiment or the second embodiment are denoted by the same reference signs, and detailed description of those components is omitted.

(Sterilization System)

First, a sterilization system to perform a sterilization method according to this embodiment will be described below with reference to FIG. 11.

Figure 11:
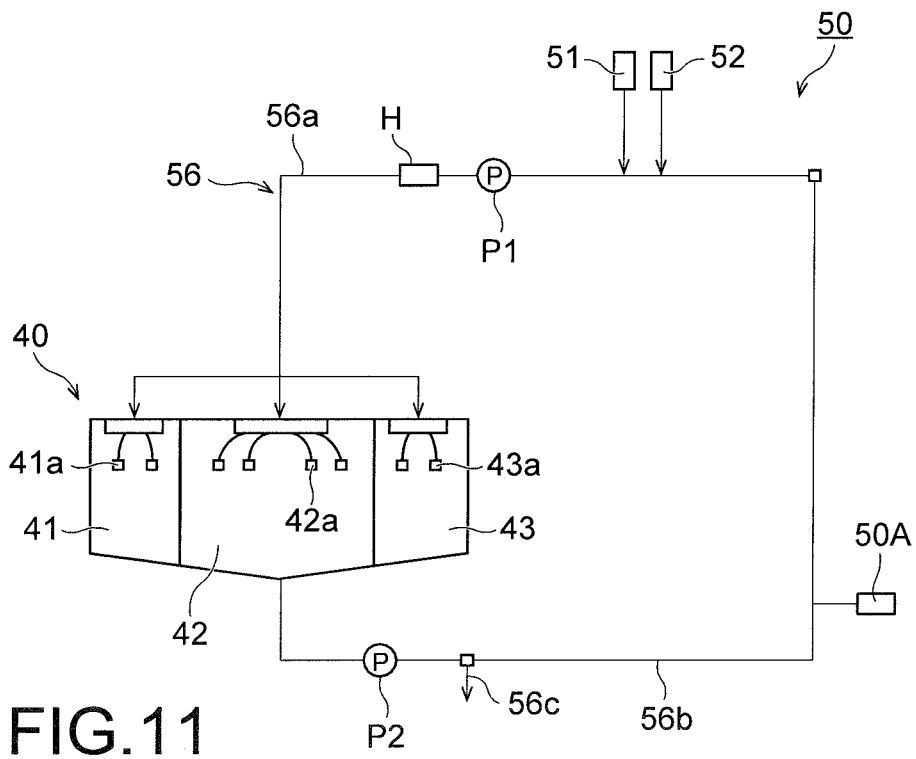
FIG. 11 is a block diagram of a sterilization system performing a sterilization method according to a third embodiment of the present disclosure.

As illustrated in FIG. 11, a sterilization system 50 according to this embodiment does not include the tank T. In this embodiment, the sterilization system 50 includes a circulation line 56 in which a heater H for heating the sterilizer and a sterile chamber 40 are successively disposed, and through which the sterilizer is circulated. The sterilization system 50 further includes a water supply unit 51 for supplying water to the circulation line 56, and a sterilizer concentrate supply unit 52 for supplying a sterilizer concentrate to the circulation line 56. Thus, in this embodiment, the water supply unit 51 and the sterilizer concentrate supply unit 52 are configured to supply water and the sterilizer concentrate, respectively, to the circulation line 56.

The circulation line 56 serves to circulate the sterilizer therethrough and to heat the sterilizer up to a desired temperature. As described above, the heater H for heating the sterilizer and the sterile chamber 40 are successively disposed in the circulation line 56. In more detail, the circulation line 56 includes a supply pipe 56a disposed upstream of the sterile chamber 40, a feedback pipe 56b coupled to the sterile chamber 40 and disposed downstream of the sterile chamber 40, and a drainpipe 56c coupled to the feedback pipe 56b. The water from the water supply unit 51 and the sterilizer concentrate from the sterilizer concentrate supply unit 52 are supplied to the supply pipe 56a of the above-mentioned pipes. The supply pipe 56a is branched into multiple pipes on an upstream side of the sterile chamber 40 such that the sterilizer can be supplied to the sterilization chamber 41 (sub-chamber), the filling chamber 42 (main chamber), and the outlet chamber 43 (sub-chamber) in the sterile chamber 40 independently of one another. The feedback pipe 56b serves not only to discharge the sterilizer from the sterile chamber 40, but also to deliver the sterilizer having passed through the sterile chamber 40 to the supply pipe 56a. The feedback pipe 56b is coupled to the supply pipe 56a. A pump P2 for circulating the sterilizer is disposed in the feedback pipe 56b. The drainpipe 56c serves to discharge the sterilizer after the sterilization of the sterile chamber 40.

Although not illustrated, in addition to valves for switching flow paths, thermometers, and/or actuators, various meters such as flow meters and densitometers, various selector valves, filters, etc. are further disposed in the circulation line 56 as well. Those components are also controlled in accordance with signals from a controller 50A.
(Sterilization Method)

Figure 12:
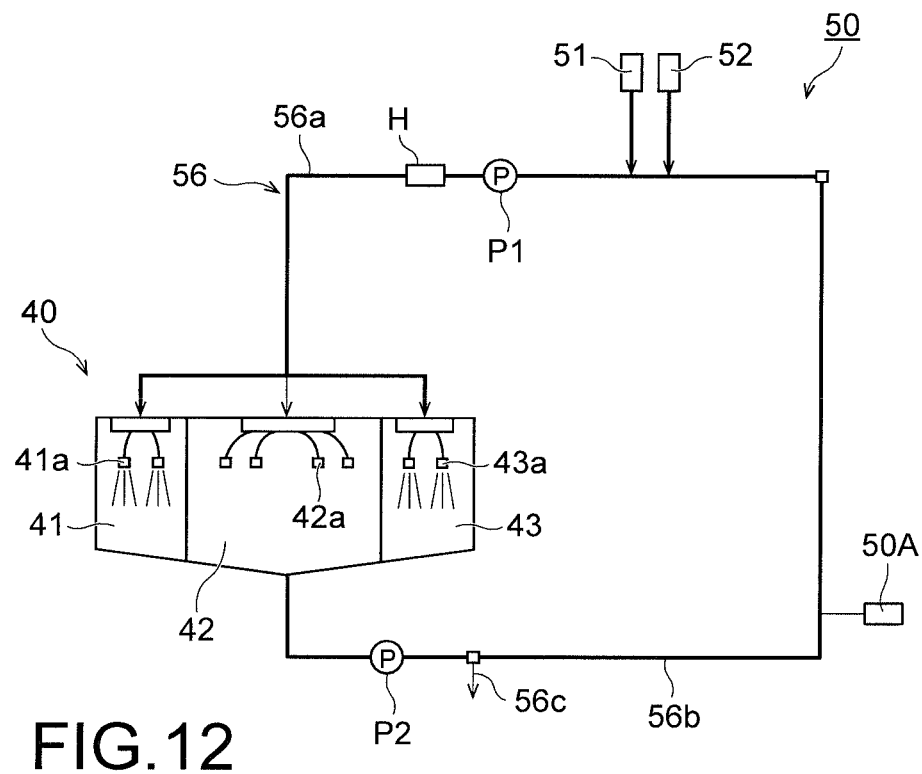
FIG. 12 is a block diagram illustrating the sterilization method according to the third embodiment of the present disclosure.

The sterilization method according to this embodiment will be described below with reference to FIGS. 12 to 14.

First, an operation button of the controller 50A is operated. In response to the operation of the button, the water and the sterilizer concentrate are supplied to the circulation line 56 from the water supply unit 51 and the sterilizer concentrate supply unit 52, respectively. Thus, the sterilizer concentrate is diluted with the water in the circulation line 56, and the sterilizer is prepared. In this case, flow rates of the water and the sterilizer concentrate are measured by flowmeters (not illustrated). The flow rates of the water and the sterilizer concentrate are adjusted in accordance with signals from the controller 50A such that the prepared sterilizer is held at a predetermined concentration.
(Circulation Step)

Then, the sterilizer is circulated through the circulation line 56 while the sterilizer is being heated by the heater H. On that occasion, the sterilizer in the circulation line 56 is circulated through the circulation line 56 via the sterilization chamber 41 (sub-chamber) and the outlet chamber 43 (sub-chamber) while the sterilizer is being heated by the heater H. In this embodiment, the pump P1 and the pump P2 in the circulation line 56 are driven, and the sterilizer is circulated through the circulation line 56 (see FIG. 12). Here, the supply pipe 56a is communicated with the sterilization chamber 41 and the outlet chamber 43 through valves (not illustrated). Thus, the sterilizer in the supply pipe 56a of the circulation line 56 is supplied to the sterilization chamber 41 (sub-chamber) and the outlet chamber 43 (sub-chamber) in the sterile chamber 40. On the other hand, the supply pipe 56a is not communicated with the filling chamber 42. Thus, the sterilizer is not supplied to the filling chamber 42 until the sterilizer is heated up to the desired temperature. Accordingly, even when microorganism survive in the sterilizer prepared in the tank T, the sterilizer with the microorganism surviving therein is suppressed from being supplied to the filling chamber 42.

Assuming here that a volume of the filling chamber 42 (main chamber) is denoted by x1, a volume of a flow path for the sterilizer in the circulation line 56 is denoted by x2, and an amount of the sterilizer circulated through the circulation line 56 in the circulation step is denoted by y, a relationship of;

$$2\times(x1+x2)\leq y\leq 100\times(x1+x2)$$

is preferably satisfied, and a relationship of;

$$3\times(x1+x2)\leq y\leq 50\times(x1+x2)$$

is more preferably satisfied. Under those conditions, the sterilizer is suppressed from running out during the sterilization of the filling chamber 42. Thus, the sterilization of the filling chamber 42 can be suppressed from being interrupted due to the necessity of making up the shortage of the sterilizer. As a result, a sterilization time for the filling chamber 42 can be shortened.

Furthermore, the sterilizer can be suppressed from being prepared more than necessary. This results in energy saving.
(Sterilization Step)

Then, the filling chamber (main chamber) 42 is sterilized by supplying the sterilizer having been heated by the heater H to the filling chamber (main chamber) 42. On that occasion, the sterilizer having been heated by the heater H is supplied to the filling chamber 42 (main chamber) through the circulation line 56. In this embodiment, an operation button of the controller 50A is first operated. In response to the operation of the button, a valve (not illustrated) is switched, whereby the supply pipe 56a of the circulation line 56 and the filling chamber 42 are communicated with each other.

Figure 13:
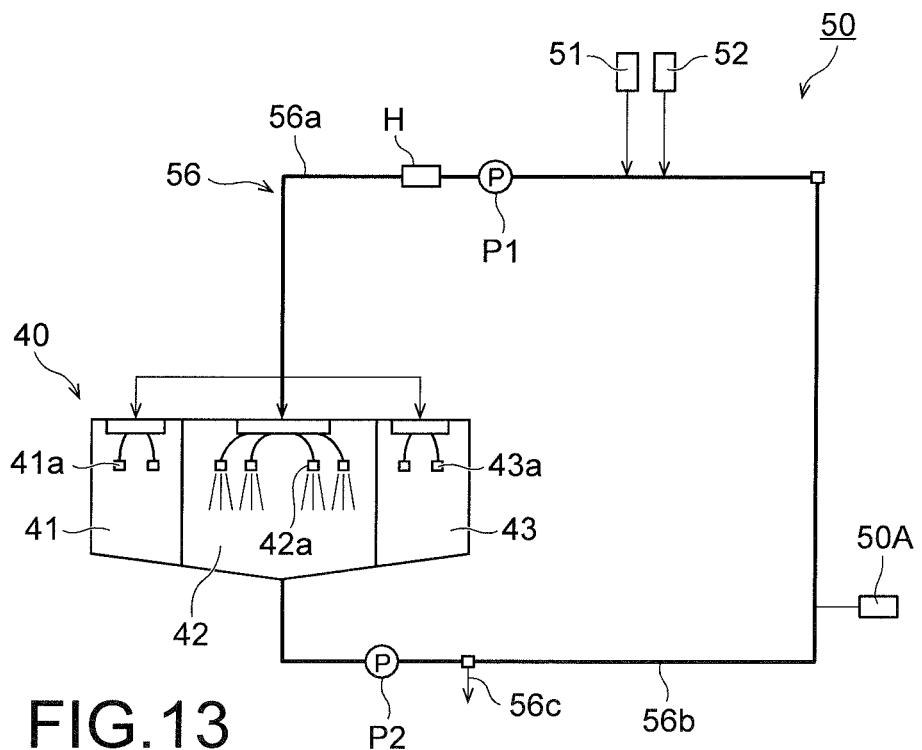
FIG. 13 is a block diagram illustrating the sterilization method according to the third embodiment of the present disclosure.

Then, as illustrated in FIG. 13, the sterilizer having passed through the supply pipe 56a of the circulation line 56 is supplied to the filling chamber 42 (main chamber) in the sterile chamber 40. At that time, the sterilizer may be further supplied to the sterilization chamber 41 and the outlet chamber 43 in the sterile chamber 40.

Then, the sterilizer is circulated through the circulation line 56 via the filling chamber 42 for a predetermined time.

Figure 14:
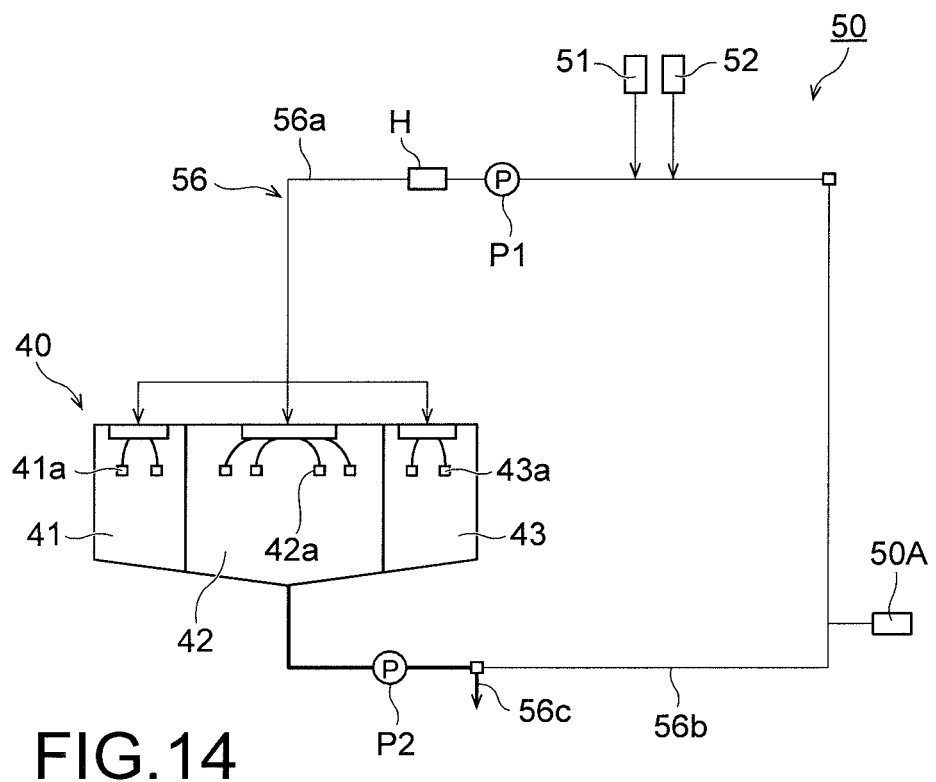
FIG. 14 is a block diagram illustrating the sterilization method according to the third embodiment of the present disclosure.

Thereafter, as illustrated in FIG. 14, the sterilizer is discharged as a waste liquid to the outside through the drainpipe 56c disposed in the feedback pipe 56b of the circulation line 56. Note that the sterilizer having been delivered to the feedback pipe 56b from the filling chamber 42 may be discharged as the waste liquid to the outside through the drainpipe 56c without being circulated through the circulation line 56 via the filling chamber 42.

According to this embodiment, as described above, the sterilizer heated up to the desired temperature can also be supplied to the filling chamber 42. Therefore, even when the microorganism with resistance to the component of the sterilizer survive in the water supplied to the circulation line 56 from the stage before being supplied, those microorganisms can be killed. As a result, even when the microorganism with resistance to the component of the sterilizer survive in the water supplied to the circulation line 56 from the stage before being supplied, the reduction in sterilization effect of the sterilizer can be suppressed.

The above embodiment has been described in connection with an example in which the sterilizer is circulated in the circulation step through the circulation line 56 via the sterilization chamber 41 (sub-chamber) and the outlet chamber 43 (sub-chamber) while the sterilizer is being heated by the heater H, but the present disclosure is not limited to that example. In another example, although not illustrated, the sterilizer may be circulated in the circulation step through the circulation line 56 via only one of the sterilization chamber 41 (sub-chamber) and the outlet chamber 43 (sub-chamber).

Alternatively, in the circulation step, the sterilizer in the tank T may be circulated through the circulation line 55 via a cap sterilization device 17. In this case, with a configuration that the cap sterilization device 17 is disposed in the circulation line 55, the sterilizer in the tank T can be circulated through the circulation line 55 via the cap sterilization device 17.

When the content filling system 10 includes a bottle molding section 100 (see FIG. 1B), the sterilizer in the tank T may be circulated in the circulation step through the circulation line 55 via, for example, at least one of a molding chamber 120 and an atmosphere shutoff chamber 131 in the bottle molding section 100. In this case, with a configuration that the molding chamber 120 and the atmosphere shutoff chamber 131 are disposed in the circulation line 55, the sterilizer in the tank T can be circulated through the circulation line 55 via at least one of the molding chamber 120 and the atmosphere shutoff chamber 131.

Two or more among the constituent elements disclosed in the above-described embodiments and modifications can be combined with each other as appropriate when required. In other cases, some of all the constituent elements disclosed in the above-described embodiments and modifications may be omitted.

The invention claimed is:

1. A sterilization method for use in a sterilization system comprising a circulation line, in which a heater is disposed, a supply line is coupled to the circulation line, and a main chamber is disposed in the supply line, the sterilization method comprising:
a circulation step of circulating a sterilizer used in cleaning out of place (COP) and/or sterilizing out of place (SOP) of the main chamber through the circulation line while the sterilizer is being heated by the heater;
a rinsing step of rinsing the supply line with the sterilizer heated by the heater, without supplying the sterilizer to the main chamber,
a sterilization step of sterilizing the main chamber by supplying, to the main chamber, the sterilizer heated by the heater, after the step of rinsing the supply line,
wherein the main chamber includes an injection nozzle for injecting the sterilizer in the form of a mist or a shower, and
wherein in the sterilization step, the sterilizer is injected into the main chamber, whereby inner wall surfaces of the main chamber and surfaces of an equipment in the main chamber are sterilized.

2. The sterilization method according to claim 1, wherein the sterilizer is prepared from water and a sterilizer concentrate, and
wherein the sterilization system further comprises
a tank coupled to the circulation line and storing the sterilizer,
a water supply unit that supplies the water to the tank, and
a sterilizer concentrate supply unit that supplies the sterilizer concentrate to the tank,
wherein a filling device to fill contents into bottles is arranged in the main chamber,
wherein the sterilizer in the tank is circulated through the circulation line in the circulation step while the sterilizer is being heated by the heater, and
wherein the sterilizer heated by the heater is supplied to the main chamber through the supply line in the sterilization step.

3. The sterilization method according to claim 2, further comprising a recovery step of returning, to the tank, the sterilizer supplied to the main chamber.

4. The sterilization method according to claim 1, wherein the sterilizer is prepared from water and a sterilizer concentrate, and
wherein the sterilization system further comprises
a tank coupled to the circulation line and storing the sterilizer,
a water supply unit that supplies the water to the tank, and
a sterilizer concentrate supply unit that supplies the sterilizer concentrate to the tank,
wherein the heater and a sterile chamber are successively disposed in the circulation line,
wherein the sterile chamber includes the main chamber and a sub-chamber disposed on at least one of an inlet side and an outlet side of the main chamber,
wherein a filling device to fill contents into bottles is arranged in the main chamber,
wherein the sterilizer in the tank is circulated through the circulation line via the sub-chamber in the circulation step while the sterilizer is being heated by the heater, and
wherein the sterilizer heated by the heater is supplied to the main chamber through the circulation line in the sterilization step.

5. The sterilization method according to claim 4, further comprising a recovery step of returning, to the tank, the sterilizer supplied to the main chamber.

6. The sterilization method according to claim 1, wherein the sterilization system further comprises:
a water supply unit that supplies water to the circulation line; and
a sterilizer concentrate supply unit that supplies a sterilizer concentrate to the circulation line,
wherein the heater and a sterile chamber are successively disposed in the circulation line,
wherein the sterilizer is prepared from the water and the sterilizer concentrate,
wherein the sterile chamber includes the main chamber and a sub-chamber disposed on at least one of an inlet side and an outlet side of the main chamber,
wherein a filling device to fill contents into bottles is arranged in the main chamber,
wherein the sterilizer is circulated through the circulation line in the circulation step via the sub-chamber while the sterilizer is being heated by the heater, and
wherein the sterilizer heated by the heater is supplied to the main chamber through the circulation line in the sterilization step.

7. The sterilization method according to claim 1, wherein, in the sterilization step, a temperature of the sterilizer is 40° C. or higher and 90° C. or lower.

8. The sterilization method according to claim 1, wherein, in the circulation step, a circulation time for the sterilizer to circulate through the circulation line is 5 min or longer and 60 min or shorter.

9. The sterilization method according to claim 1, wherein the sterilizer contains peracetic acid or hydrogen peroxide.

10. The sterilization method according to claim 1, wherein, in the sterilization step, the sterilizer is further heated by the heater.

11. The sterilization method according to claim 1, further comprising, prior to the sterilization step, a cleaning step of cleaning the main chamber by supplying an alkaline detergent to the main chamber.

12. A sterilization system comprising:
a circulation line in which a heater is disposed;
a supply line coupled to the circulation line;
a main chamber disposed in the supply line; and
a controller connected to the circulation line,
wherein the controller causes a sterilizer to be circulated through the circulation line while the sterilizer is being heated by the heater, without supplying the sterilizer to the main chamber, causes the supply line to be rinsed with the sterilizer heated by the heater, without supplying the sterilizer to the main chamber, and then causes the sterilizer heated by the heater to be supplied to the main chamber for cleaning out of place (COP) and/or sterilizing out of place (SOP) of the main chamber,
wherein the main chamber includes an injection nozzle for injecting the sterilizer in the form of a mist or a shower, and
wherein the sterilizer is injected into the main chamber, whereby inner wall surfaces of the main chamber and surfaces of an equipment in the main chamber are sterilized.

13. The sterilization system according to claim 12, wherein the sterilizer is prepared from water and a sterilizer concentrate, and
wherein the sterilization system further comprises
a tank coupled to the circulation line and storing the sterilizer,
a water supply unit that supplies the water to the tank, and
a sterilizer concentrate supply unit that supplies the sterilizer concentrate to the tank,
wherein a filling device to fill contents into bottles is arranged in the main chamber, and
wherein the controller causes the sterilizer in the tank to be circulated through the circulation line while the sterilizer is being heated by the heater, without supplying the sterilizer to the main chamber, and causes the sterilizer heated by the heater to be supplied to the main chamber through the supply line.

14. The sterilization system according to claim 12, wherein the sterilizer is prepared from water and a sterilizer concentrate, and
wherein the sterilization system further comprises
a tank coupled to the circulation line and storing the sterilizer,
a water supply unit that supplies the water to the tank, and
a sterilizer concentrate supply unit that supplies the sterilizer concentrate to the tank,
wherein the heater and a sterile chamber are successively disposed in the circulation line,
wherein the sterile chamber includes the main chamber and a sub-chamber disposed on at least one of an inlet side and an outlet side of the main chamber,
wherein a filling device to fill contents into bottles is arranged in the main chamber, and
wherein the controller causes the sterilizer in the tank to be circulated through the circulation line via the sub-chamber while the sterilizer is being heated by the heater, and causes the sterilizer heated by the heater to be supplied to the main chamber through the circulation line.

15. The sterilization system according to claim 12, wherein the sterilization system further comprises:
a water supply unit that supplies water to the circulation line; and
a sterilizer concentrate supply unit that supplies a sterilizer concentrate to the circulation line,
wherein the heater and a sterile chamber are successively disposed in the circulation line,
wherein the sterilizer is prepared from the water and the sterilizer concentrate,
wherein the sterile chamber includes the main chamber and a sub-chamber disposed on at least one of an inlet side and an outlet side of the main chamber,
wherein a filling device to fill contents into bottles is arranged in the main chamber, and
wherein the controller causes the sterilizer to be circulated through the circulation line via the sub-chamber while the sterilizer is being heated by the heater, and causes the sterilizer heated by the heater to be supplied to the main chamber through the circulation line.

* * * * *